US011528096B2

(12) United States Patent
Kitamura et al.

(10) Patent No.: US 11,528,096 B2
(45) Date of Patent: Dec. 13, 2022

(54) USER TERMINAL AND RADIO COMMUNICATION METHOD

(71) Applicant: NTT DOCOMO, INC., Tokyo (JP)

(72) Inventors: Yasuhiro Kitamura, Tokyo (JP); Hiroki Harada, Tokyo (JP); Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/310,574

(22) PCT Filed: Jun. 19, 2017

(86) PCT No.: PCT/JP2017/022483
§ 371 (c)(1),
(2) Date: Dec. 17, 2018

(87) PCT Pub. No.: WO2017/221871
PCT Pub. Date: Dec. 28, 2017

(65) Prior Publication Data
US 2019/0181986 A1 Jun. 13, 2019

(30) Foreign Application Priority Data
Jun. 20, 2016 (JP) .............................. JP2016-121998

(51) Int. Cl.
*H04L 1/16* (2006.01)
*H04W 28/04* (2009.01)
(Continued)

(52) U.S. Cl.
CPC .............. *H04L 1/1614* (2013.01); *H04L 1/16* (2013.01); *H04L 1/1819* (2013.01);
(Continued)

(58) Field of Classification Search
CPC ....... H04L 1/16; H04L 5/0007; H04L 1/1819; H04L 5/0055; H04L 1/1614; H04W 28/04
See application file for complete search history.

(56) References Cited

U.S. PATENT DOCUMENTS

| 9,009,555 B2 | 4/2015 | Ito |
| 9,294,959 B2 | 3/2016 | Seyama et al. |

(Continued)

FOREIGN PATENT DOCUMENTS

| JP | 2010213067 A | 9/2010 |
| WO | 2010109521 A1 | 9/2010 |
| WO | 2010113214 A1 | 10/2010 |

OTHER PUBLICATIONS

Extended European Search Report issued in the counterpart European Patent Application No. 17815339.1, dated May 24, 2019 (10 pages).

(Continued)

*Primary Examiner* — Syed Ali
(74) *Attorney, Agent, or Firm* — Osha Bergman Watanabe & Burton LLP

(57) ABSTRACT

The present invention is designed to improve the efficiency of the use of radio resources in retransmission control in future radio communication systems. A user terminal according to one aspect of the present invention has a receiving section that receives a downlink (DL) signal, and a control section that, when a transport block of the DL signal is divided into a plurality of code blocks, controls transmission of retransmission control information representing an acknowledgment (ACK) or a negative acknowledgment (NACK) for each code block, or representing an ACK or a NACK for each code block group, which groups fewer code blocks than the plurality of code blocks.

4 Claims, 15 Drawing Sheets

(51) Int. Cl.
*H04L 1/18* (2006.01)
*H04L 5/00* (2006.01)

(52) U.S. Cl.
CPC .......... *H04L 5/0007* (2013.01); *H04L 5/0055* (2013.01); *H04W 28/04* (2013.01)

(56) References Cited

U.S. PATENT DOCUMENTS

| | | | | |
|---|---|---|---|---|
| 10,674,519 | B2* | 6/2020 | Lee | H04L 5/0091 |
| 2009/0313516 | A1* | 12/2009 | Shin | H04L 1/1806 714/748 |
| 2011/0087948 | A1* | 4/2011 | Murakami | H03M 13/17 714/758 |
| 2013/0039297 | A1* | 2/2013 | Wang | H04W 76/25 370/328 |
| 2013/0128859 | A1* | 5/2013 | Takaoka | H04L 5/0094 370/329 |
| 2014/0126359 | A1* | 5/2014 | Sarkar | H04W 72/0486 370/230 |
| 2015/0215909 | A1* | 7/2015 | Takeda | H04L 5/0096 370/329 |
| 2016/0036578 | A1 | 2/2016 | Malladi et al. | |
| 2016/0338095 | A1* | 11/2016 | Faurie | H04W 28/0278 |
| 2017/0126439 | A1* | 5/2017 | Yoshimoto | H04L 5/006 |
| 2017/0230156 | A1* | 8/2017 | Fakoorian | H04W 72/085 |
| 2017/0265225 | A1* | 9/2017 | Takeda | H04W 72/1284 |
| 2017/0332374 | A1* | 11/2017 | Koorapaty | H04L 1/1812 |
| 2018/0007731 | A1* | 1/2018 | Park | H04L 5/001 |
| 2018/0054800 | A1* | 2/2018 | Yeo | H04W 72/08 |
| 2018/0145851 | A1* | 5/2018 | Kusashima | H04J 11/0079 |
| 2018/0145986 | A1* | 5/2018 | Chien | H04L 63/0236 |
| 2018/0351720 | A1* | 12/2018 | Ouchi | H04L 27/2605 |
| 2019/0261347 | A1* | 8/2019 | Harada | H04W 16/28 |
| 2019/0261364 | A1* | 8/2019 | Takeda | H04W 72/04 |
| 2019/0268946 | A1* | 8/2019 | Harada | H04W 28/04 |
| 2020/0305218 | A1* | 9/2020 | Zhu | H04L 1/1816 |

OTHER PUBLICATIONS

International Search Report issued in PCT/JP2017/022483, dated Sep. 12, 2017 (2 pages).
Written Opinion of the International Searching Authority issued in PCT/JP2017/022483, dated Sep. 12, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Chinese Application No. 201780038437.6; dated Feb. 24, 2021 (15 pages).
Office Action issued in the counterpart European Patent Application No. 17815339.1, dated Mar. 31, 2021 (7 pages).
Office Action in counterpart Chinese Application No. 201780038437.6 dated Jan. 25, 2022 (9 pages).
Office Action in counterpart Japanese Patent Application No. 2018-524070 dated Mar. 15, 2022 (5 pages).
Office Action in counterpart Chinese Application No. 201780038437.6 dated Aug. 13, 2021 (12 pages).
Office Action in counterpart Japanese Patent Application No. 2018-524070 dated Aug. 24, 2021 (6 pages).

* cited by examiner

FIG. 6A

| CB#1 | CB#2 | CB#3 | CB#4 |
|---|---|---|---|
| 0 or 1 | 0 or 1 | 0 or 1 | 0 or 1 |

0 : NACK  1 : ACK

FIG. 6B

| CB#1 | CB#2 | CB#3 | CB#4 | CB#5 | CB#6 |
|---|---|---|---|---|---|
| 0 or 1 | 0 or 1 | 0 or 1 | 0 or 1 | 0 or 1 | 0 or 1 |

0 : NACK  1 : ACK

FIG. 7A

| PATTERN INFORMATION | 000 | 001 | 010 | 011 | 100 | 101 | 110 | 111 |
|---|---|---|---|---|---|---|---|---|
| COMBINATION OF A/Ns OF CB #1 to #4 | 0000 | 0011 | 1100 | 1110 | 1101 | 1011 | 0111 | 1111 |

0 : NACK   1 : ACK

FIG. 7B

| PATTERN INFORMATION | 000 | 001 | 010 | 011 | 100 | 101 | 110 | 111 |
|---|---|---|---|---|---|---|---|---|
| COMBINATION OF A/Ns OF CB #1 to #6 | 000000 | 111110 | 111101 | 111011 | 110111 | 101111 | 011111 | 11111 |

0 : NACK   1 : ACK

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10 to 13," etc.) have been drafted for further broadbandization and increased speed beyond LTE (also referred to as "LTE Rel. 8 or 9"), and successor systems of LTE (also referred to as, for example, "FRA (Future Radio Access)," "5G (5th generation mobile communication system)," "NR (New RAT (Radio Access Technology)," "LTE Rel. 14 and later versions," etc.) are under study.

In existing LTE systems (for example, Rel. 13 and earlier versions), adaptive modulation coding (AMC), which adaptively changes at least one of the modulation scheme, the transport block size (TBS), and the coding rate, is executed for link adaptation. Here, the TBS is the size of transport blocks (TBs), which are units of information bit sequences. One or more TBs are assigned to one subframe.

For example, in the downlink (DL), the radio base station determines the MCS (Modulation and Coding Scheme), indicating the modulation scheme (modulation order) of the DL signal (for example, down link shared channel (PDSCH (Physical Downlink Shared Channel)) and the TBS index, based on the channel quality indicator (CQI (Channel Quality Indicator)) fed back from the user terminal. The radio base station determines the TBS of the DL signal based on the TBS index indicated by the MCS index and the number of resource blocks (for example, physical resource block (PRB (Physical Resource Block)) allocated to the DL signal.

In DL, the TBS (or MCS index used to determine TBS) is preferably determined so that the coding rate of the DL signal does not exceed 0.931. Here, the coding rate can be obtained by, for example, dividing the number of information bits including CRC (Cyclic Redundancy Check) bits by the number of bits that can be used for PDSCH. For example, since the number of resource elements (REs) that can be used for PDSCH is limited in a subframe in which the reference signal for measurement of channel state information (CSI) (CSI-RS (Channel State Information-Reference Signal)) is configured, even if the radio base station determines the MCS index indicating the large TBS index value and reports it to the user terminal, the user terminal skips decoding of the PDSCH.

Meanwhile, in the uplink (UL), the user terminal determines the TBS of the UL signal based on the MCS index specified by the radio base station and the number of resource blocks allocated to the UL signal.

Furthermore, in existing LTE systems, retransmission control (HARQ (Hybrid Automatic Repeat reQuest)) of DL signals and UL signals is performed per TB, whose size (TBS) is determined as described above.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, etc.), it is desirable to accommodate various services such as high-speed and large-capacity communication (eMBB: enhanced Mobile Broad Band), massive access (mMTC: massive MTC) from devices (user terminal) for inter-device communication (M2M: Machine-to-Machine) such as IoT (Internet of Things) and MTC (Machine Type Communication), and low-latency, reliable communication (URLLC: Ultra-Reliable and Low Latency Communication), in a single framework.

However, in such a future radio communication system, if retransmission control is performed for each TB as in existing systems, the efficiency of the use of radio resources may deteriorate. Therefore, retransmission control capable of improving the utilization efficiency of radio resources in a future radio communication system is desired.

The present invention has been made in view of the above, and it is therefore an object of the present invention to provide a user terminal and a radio communication method that are capable of improving the efficiency of the use of radio resources in retransmission control in future radio communication systems.

Solution to Problem

According to one aspect of the present invention, a user terminal has a receiving section that receives a downlink (DL) signal, and a control section that, when a transport block of the DL signal is divided into a plurality of code blocks, controls transmission of retransmission control information representing an acknowledgment (ACK) or a negative acknowledgment (NACK) for each code block, or representing an ACK or a NACK for each code block group, which groups fewer code blocks than the plurality of code blocks.

According to another aspect of the present invention, a user terminal has a transmission section that transmits an uplink (UL) signal, and a control section that, when a transport block of the UL signal is divided into a plurality of code blocks, controls retransmission of the UL signal per code block, or per code block group that groups fewer code blocks than the plurality of code blocks.

Advantageous Effects of Invention

According to the present invention, it is possible to improve the efficiency of the use of radio resources in retransmission control in future radio communication systems.

BRIEF DESCRIPTION OF DRAWINGS

FIGS. 6A and 6B are diagrams to show examples of a first configuration of retransmission control information according to the first aspect of the present invention;

FIGS. 7A and 7B are diagrams to show examples of the second configuration of retransmission control information according to the first aspect;

DESCRIPTION OF EMBODIMENTS

Figure 1:
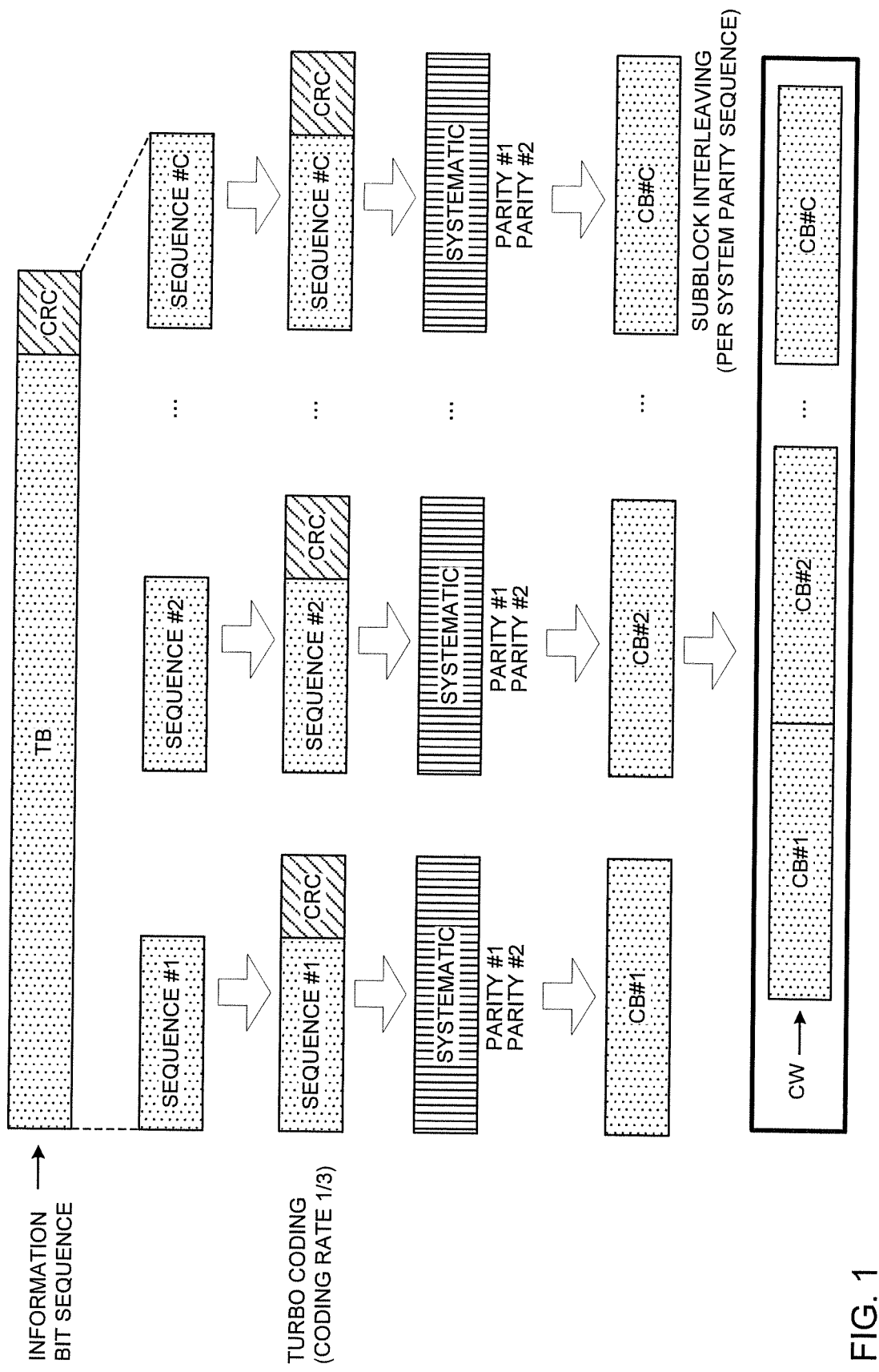
FIG. 1 is a diagram to show an example of transmission process where code block segmentation is employed.

FIG. 1 is a diagram to show an example of transmission process where code block segmentation is employed. Code block segmentation is to divide a transport block (hereinafter abbreviated as "TB") into a plurality of segments when a TB, to which CRC bits are added (information bit sequence including CRC bits), exceeds a predetermined threshold (for example, 6144 bits). Code block segmentation is executed, for example, to adjust the TBS to a size that is compatible with the encoder, and the above predetermined threshold may be equal to the maximum size that is compatible with the encoder.

As shown in FIG. 1, when the TB size (TBS) exceeds a predetermined threshold (for example, 6144 bits), this information bit sequence, including CRC bits, is divided (segmented) into a plurality of segments on the transmitting side. Note that filler bits may be appended to the top of segment #1.

As shown in FIG. 1, CRC bits (for example, 24 bits) are added to each segment, and channel coding (for example, turbo coding) is performed at a predetermined coding rate (for example, 1/3). By channel coding, systematic bits and first and second parity bits (#1 and #2) are generated as code bits for each code block (hereinafter abbreviated as "CB").

The systematic bit sequence, the first parity bit sequence, and the second parity bit sequence are individually interleaved (subblock interleaving) and input to the buffer (circular buffer). From the buffer, the code bits in each CB are selected (rate matching) based on the number of REs that can be used in the allocated resource blocks and the redundancy version (RV (Redundancy version)).

Each CB, comprised of selected code bits, is concatenated to form a codeword (CW). The codeword is subjected to scrambling, data modulation and so on, and then transmitted.

Figure 2:
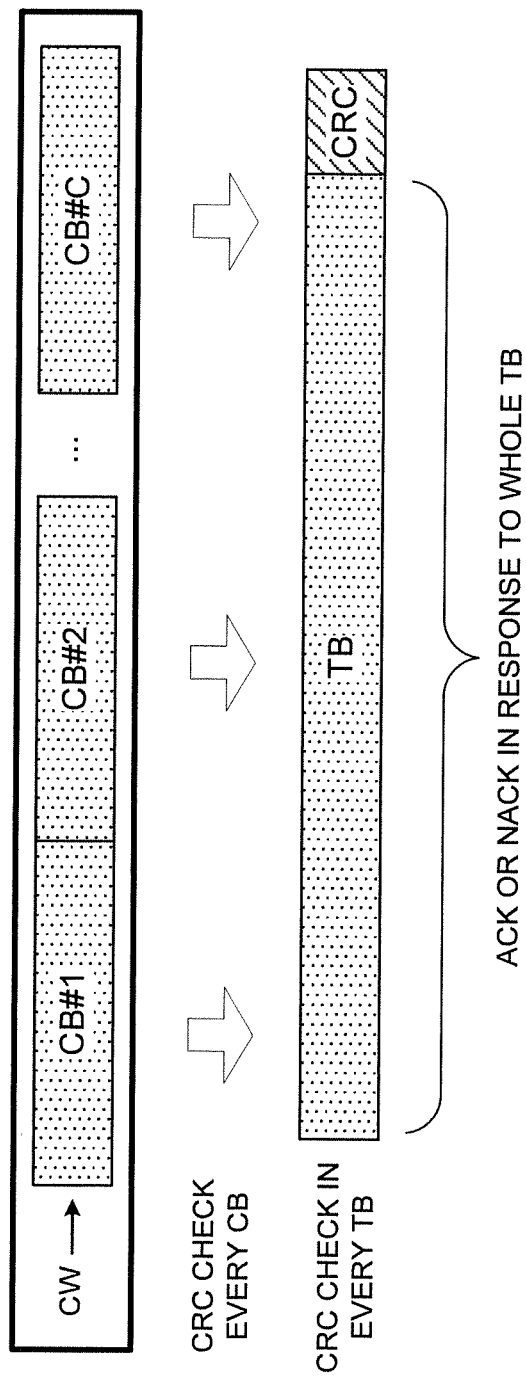
FIG. 2 is a diagram to show an example of receiving process where code block segmentation is employed.

FIG. 2 is a diagram to show an example of receiving process where code block segmentation is employed. On the receiving side, the TBS is determined based on the TBS index and the number of resource blocks allocated (for example, PRBs (Physical Resource Block)), and, based on the TBS, the number of CBs is determined.

As shown in FIG. 2, on the receiving side, each CB is decoded, and error detection of each CB is performed using the CRC bits appended to each CB. Also, code block segmentation is undone, so as to recover the TB. Furthermore, error detection of the whole TB is performed using the CRC bits appended to the TB.

In existing LTE systems, the receiving side transmits retransmission control information (also referred to as "ACK (Acknowledgment)" or "NACK (Negative ACK)" (hereinafter abbreviated as "A/N"), and "HARQ-ACK," etc.) in response to whole TB is transmitted to the transmitting side depending on the error detection result of the whole TB. On the transmitting side, the whole TB is retransmitted in response to a NACK from the receiving side.

Figure 3:
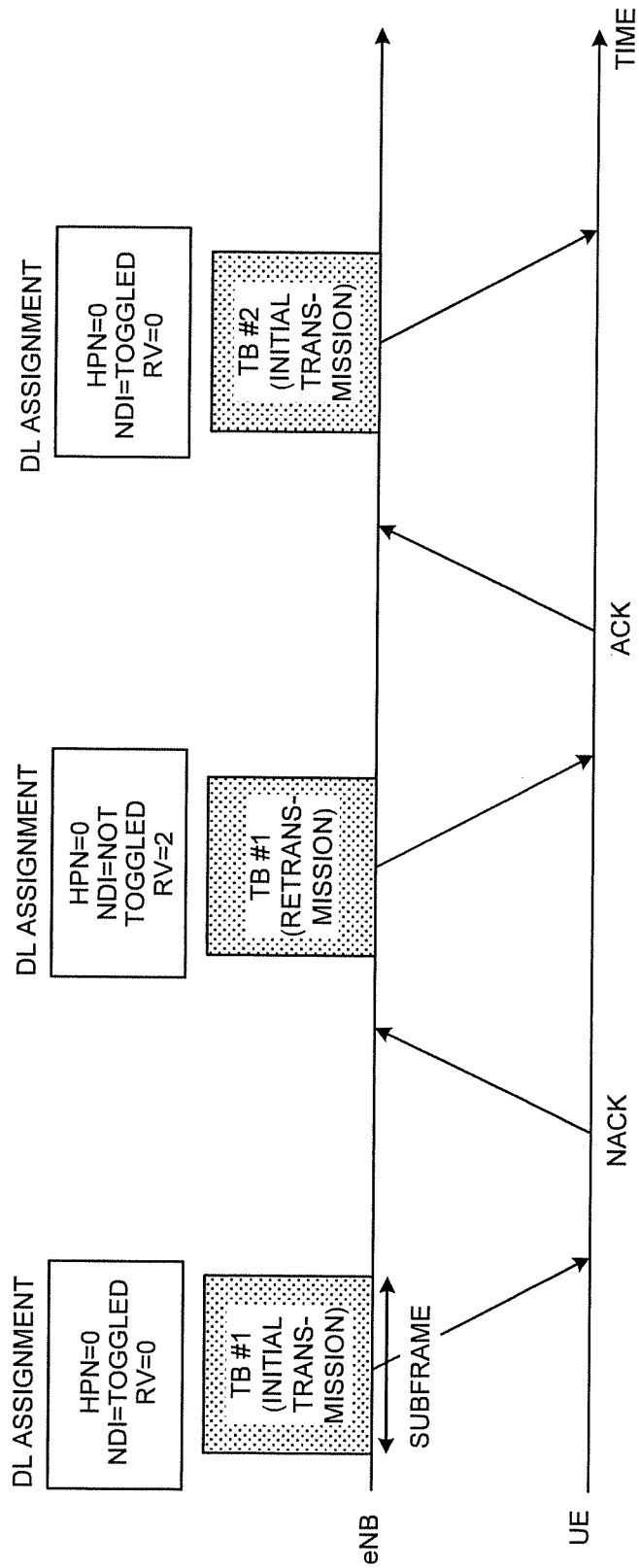
FIG. 3 is a diagram to show an example of DL retransmission control in an existing LTE system.

FIG. 3 is a diagram to show an example of retransmission control for DL signals in an existing LTE system. In existing LTE systems, retransmission control is executed on per a TB basis, irrespective of whether or not a TB is divided into a plurality of CBs. To be more specific, HARQ processes are assigned on a per TB basis. Here, HARQ processes are processing units in retransmission control, and every HARQ process is identified by a HARQ process number (HPN). One or more HARQ processes are configured in a user terminal (UE: User Terminal), in the EIARQ process of the same HPN, the same data keeps being retransmitted until an ACK is received.

For example, referring to FIG. 3, HPN=0 is assigned to TB #1 for the initial transmission. Upon receiving a NACK, the radio base station (eNB: eNodeB) retransmits same TB #1 in HPN=0, and, upon receiving an ACK, the radio base station transmits next TB #2, for the first time, in HPN=0.

Also, in downlink control information (DCI) (DL assignment) that allocates the DL signal (for example, a PDSCH) for transmitting TBs, the radio base station can include the above HPN, a new data indicator (NDI) and a redundancy version (RV).

Here, the NDI is an indicator to distinguish between initial transmission and retransmission. For example, the NDI indicates retransmission if the NDI is not toggled in the same HPN (has the same value as the previous value), and indicates initial transmission if the NDI is toggled (has a different value from the previous value).

In addition, the RV indicates the difference in the redundancy of transmission data. The values of RVs include, for example, 0, 1, 2 and 3, where 0 indicates the lowest degree of redundancy, and is used for initial transmission.

By applying a different RV value to every transmission with the same HPN, HARQ gain can be achieved effectively.

For example, in FIG. 3, the DCI in the initial transmission of TB #1 includes the HPN "0," a toggled NDI, and the RV value "0." Therefore, the user terminal can recognize that the HPN "0" is initial transmission and decodes TB #1 based on the RV value "0." On the other hand, the DCI in the retransmission in TB #1 includes the HPN "0," an untoggled NDI, and the RV value "2." Therefore, the user terminal can recognize that the HPN "0" is retransmission, and decodes TB #1 based on the RV value "2." The initial transmission of TB #2 is the same as upon the initial transmission of TB #1.

As described above, in existing LTE systems, retransmission control is executed on a per TB basis, regardless of whether or not code block segmentation is employed. For this reason, when code block segmentation is employed, if errors concentrate in a portion of C (C>1) CBs that are formed by dividing a TB, the whole TB is retransmitted. Therefore, not only CBs where errors are detected, but also CBs where no error is detected are subject to retransmission, and therefore there is a danger that the efficiency of the use of radio resources will decline.

In future radio communication systems (for example, 5G, NR, etc.), communication at higher speeds and with larger capacity (eMBB) than existing LTE systems is anticipated, so that there may be more cases where a TB is divided into many CBs. In such a future radio communication system, if retransmission is controlled in units of TB as in existing LTE systems, the efficiency of the use of radio resources may further decrease.

So, in accordance with one aspect of the present invention, the present inventors have come up with the idea of improving the efficiency of the use of radio resources when TBs are divided into multiple CBs, by performing retransmission control in smaller units than TBs (for example, in units of CBs or in units of code block groups (CBGs), which group a plurality of CBs).

Now, embodiments of the present invention will be described below in detail with reference to the accompanying drawings. Note that, although the present embodiment will be described below assuming asynchronous retransmission control (asynchronous HARQ), the present embodiment can be appropriately applied to synchronized retransmission control (synchronous HARQ) as well. In synchronous HARQ, retransmission of each HARQ process is carries out after a certain period from the initial transmission. On the other hand, in asynchronous HARQ, retransmission of each HARQ process is carried out after an unspecified period from the initial transmission of UL data.

Also, although the present embodiment will assume the use of a DL shared channel (for example, PDSCH: Physical Downlink Shared Channel) as a DL signal, this is by no means limiting. For example, the retransmission control according to the present embodiment can also be applied to retransmission control such as random access response (RAR). Also, although the present embodiment will assume the use of a UL shared channel (for example, PUSCH (Physical Uplink Shared CHannel)) as a UL signal, this is by no means limiting.

Also, the transport block (TB) according to the present embodiment is the unit of information bit sequences, and may be, for example, at least one of the information bit sequence unit allocated to one subframe, or the unit of scheduling. Also, the TB may or may not include CRC bits.

The code block (CB) according to the present embodiment is the unit of information bits that can be input to the encoder (for example, turbo encoder). In the event the TBS is less than or equal to the size that is compatible with the encoder (maximum coding size), a TB may be referred to as a "CB." Also, in the event the TBS exceeds the compatible size with the encoder, a TB may be divided into multiple segments, and each segment may be referred to as a "CB." In addition, a segment group, which groups a number of segments (CB) fewer than the number of segments (CB) per TB may be referred to as a "code block group."

Also, retransmission control information according to the present embodiment represents an ACK or a NACK (A/N) in response to each CB, or in response to each CBG, which groups a number of CBs fewer than the above multiple CBs, but this is by no means limiting, and the retransmission control information may be any information as long as it is information for use for retransmission control in units of CBs or CBGs. For example, the retransmission control information may represent DTX instead of A/N.

(First Aspect)

In accordance with the first aspect, retransmission control of DL signals will be described. When a TB of a DL signal is divided into multiple CBs, a user terminal according to the first aspect controls transmission of retransmission control information, which indicates A/Ns for each CB, or A/Ns for each CBG, which groups a number of CBs fewer than the above multiple CBs. That is, in the first aspect, retransmission of DL signals is controlled in units of CBs or in units of CBGs.

<Retransmission Control in Units of CBs>

Figure 4:
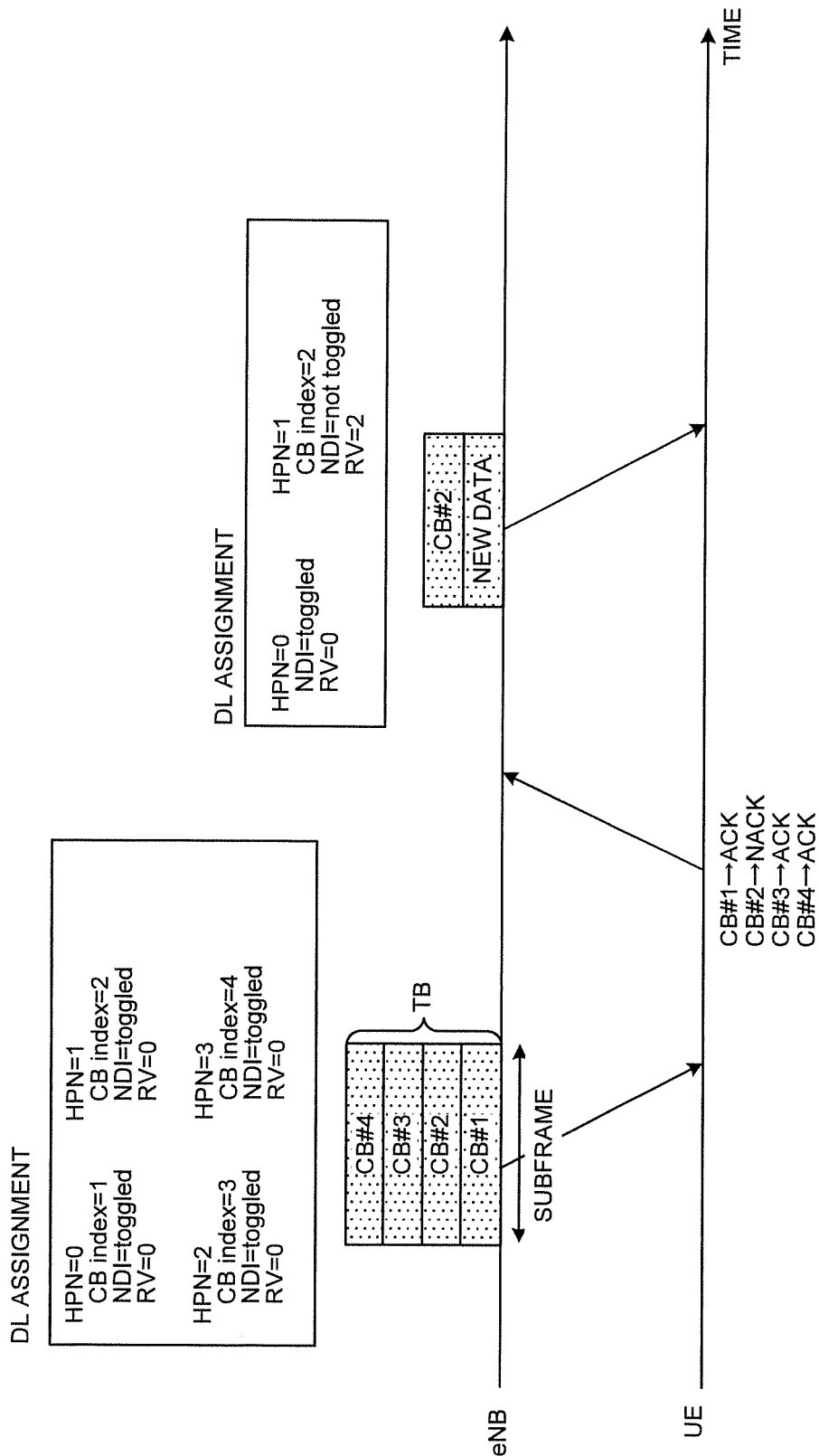
FIG. 4 is a diagram to show an example of retransmission control per CB according to a first aspect of the present invention.

With reference to FIG. 4, retransmission control in units of CBs will be explained. A CB is the unit formed by dividing a TB. The number of CBs (C) (hereinafter referred to as "the number of CBs") per TB may be fixed or variable.

For example, the number of CBs may be determined based on at least one of the TBS, the maximum size of CB (for example, 6144 bits), the number of CRC bits (for example, 24 bits), and the maximum number of HARQ processes. Furthermore, the size (K) of each CB may be fixed or variable. For example, the size of each CB may be determined based on at least one of the number of CBs, the TBS, the number of CRC bits, and the maximum number of HARQ processes.

FIG. 4 is a diagram to show an example of retransmission control per CB according to the first aspect. Note that FIG. 4 shows an example of a case where one TB is divided into four CBs (CBs #1 to #4), but the number of CBs per one TB is not limited to this.

As shown in FIG. 4, if the size of TB (TBS) (information bit sequence including CRC bits) exceeds a predetermined threshold (for example, 6144 bits), the radio base station (eNB) divides TB into C (C>1) CBs (CBs #1 to #4 in this case).

For example, in FIG. 4, CRC bits are attached to CBs #1 to #4, (for example, 24 bits), and channel coding (for example, turbo coding) and rate matching are performed for each CB at a predetermined coding rate (for example, ⅓). CBs #1 to #4 after rate matching are coupled as a CW, scrambled and modulated, and mapped in one subframe (see FIG. 1).

Also, as shown in FIG. 4, the radio base station assigns a HARQ process for each CB, not for each TB. That is, the radio base station does not assign one HARQ process per subframe, but assigns multiple HARQ processes per subframe. Therefore, the radio base station may include the HPN of each of the plurality of HARQ processes in DCI (DL assignment) that allocates the DL signal including the plurality of CBs.

Also, the radio base station may include the CB index for each HPN within the DCI so that the CB assigned to each HARQ process can be identified. Furthermore, the radio base station may include the NDI for each HPN in DCI so that the initial transmission or retransmission in each HARQ process can be identified. Also, the radio base station may include the RV for each HPN in DCI so that the RV of each HARQ process can be identified.

For example, in FIG. 4, HARQ processes of HPN=0, 1, 2 and 3 are assigned to CBs #1, #2, #3 and #4 where TBs are divided. Therefore, DCI allocating DL signals including CBs #1 to #4 may indicate HPN=0, 1, 2, and 3. Also, the DCI may indicate that the CB indices of HPN=0, 1, 2, and 3 are "#1," "#2," "#3," "#4," respectively. Also, since CBs #1 to #4 are in the initial transmission, the DCI may indicate that all the NDIs of HPN=0, 1, 2, and 3 are toggled and all the RVs of HPN=0, 1, 2 and 3 are "0."

The user terminal may demodulate the DL signal including CBs #1 to #4 based on the modulation order (modulation scheme) indicated by the MCS index included in the DCI. Furthermore, the user terminal decides the TBS based on the TBS index associated with the MCS index and the number of resource blocks (for example, the number of PRBs) allocated to the DL signal, and decodes the DL signal based on the TBS.

For example, in FIG. 4, the user terminal decodes each CB based on at least one of the CB index of each HPN, the NDI, and the RV, which are included in the DCI. The user terminal may perform error detection of each CB based on the CRC bits appended to each CB.

Furthermore, based on the error detection result of each CB, the user terminal generates retransmission control information indicating A/N for each CB. For example, in FIG. 4, the user terminal succeeds in decoding CBs #1, #3, and #4 and fails to decode CB #2. For this reason, the user terminal generates retransmission control information indicating ACKs for CBs #1, #3, and #4 and a NACK for CB #2, and feeds the retransmission control information back to the radio base station.

The radio base station generates the DL signal based on the retransmission control information fed back from the user terminal. For example, in FIG. 4, since the retransmission control information represents a NACK for CB #2, the radio base station needs to retransmit CB #2 in HPN=1. Meanwhile, retransmission control information indicates ACKs in response to CBs #1, #3 and #4 so that the radio base station can allocate new data to HPN=0, 2 and 3.

Here, the radio base station multiplexes and transmits retransmitted CB #2 of HPN=1 and new data of HPN=0. Note that the radio base station may apply a different RV to retransmitted CB #2 from that of CB #2 upon the initial transmission. Furthermore, in FIG. 4, code block segmentation is not applied to the new data, but code block segmentation may also be applied.

For example, in FIG. 4, the DCI allocating the DL signal including retransmitted CB #2 and the new data may indicate HPN=0 and 1. In addition, the DCI may indicate that the CB index of HPN=1 is "#2" and the NDI of HPN=1 is not toggled and the RV of HPN=1 is "2." Furthermore, the DCI may indicate that the NDI of HPN=0 is toggled and the RV is "0."

Since the NDI of HPN=1 in DCI is not toggled and the CB index of HPN=1 is "#2," the user terminal can recognize that CB #2 has been retransmitted at HPN=1. Furthermore, the user terminal can decode retransmitted CB #2 based on the RV "2" of HPN=1 in DCI.

Also, the NDI of HPN=0 in DCI is toggled and the CB index is not included, so that the user terminal can recognize that new data to which code block segmentation is not applied has been transmitted in HPN=0. Furthermore, the user terminal can decode new data based on RV "0" of HPN=0 in DCI.

As described above, in the case where the retransmission of DL signals is controlled for each CB, even when a TB is divided into a plurality of CBs, the user terminal can retransmit only CBs that have failed to be decoded. Therefore, the user terminal needs not retransmit the entire TB that includes CBs that have been successfully decoded so that the efficiency of the use of radio resources can be improved.

<Retransmission Control in Units of CBGs>

Figure 5:
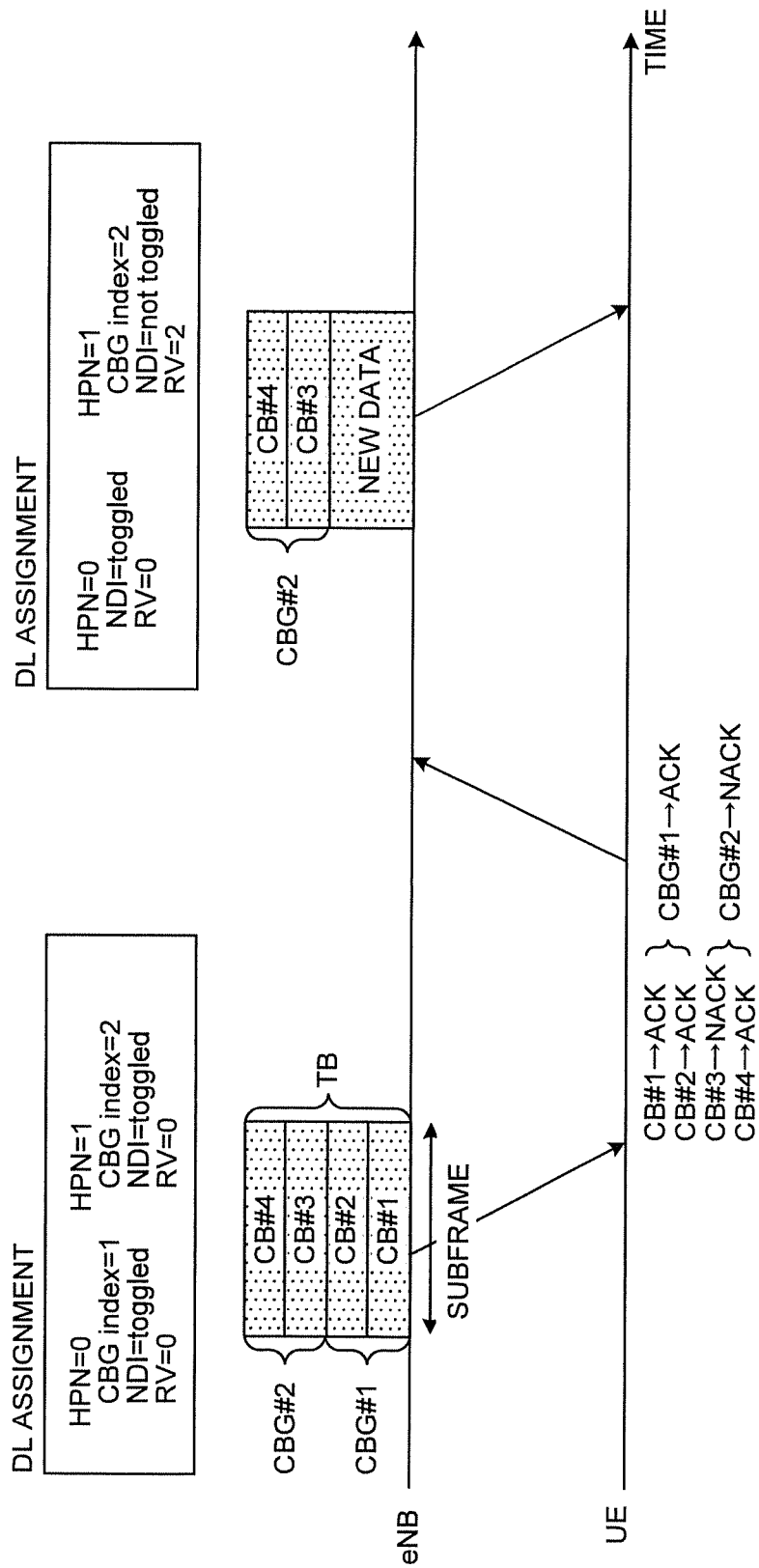
FIG. 5 is a diagram to show an example of retransmission control per CBG according to the first aspect.

With reference to FIG. 5, retransmission control in units of CBGs will be explained. A CBG groups multiple CBs. The number of CBs per CBG is configured to be less than the number of CBs per TB. The number of CBs per CBG may be fixed or variable.

For example, the number of CBs per CBG may be determined based on at least one of the number of CBs per TB, the number of CBGs per TB (hereinafter referred to as "number of CBGs"), and maximum number of HARQ processes. In addition, the number of CBGs (hereinafter referred to as "number of CBGs") may be fixed or variable. For example, the number of CBGs may be determined based on the number of CBs per TB and the maximum number of HARQ processes.

FIG. 5 is a diagram to show an example of retransmission control in units of CBGs according to the first aspect. Although FIG. 5 shows a case where one TB is divided into four CBs (CBs #1 to #4) as an example, the number of CBs per TB is not limited to this. Furthermore, in FIG. 5, assume that two CBs are grouped into CBGs, but the number of CBs per CBG is not limited to this. Hereinafter, differences from the retransmission control (for example, FIG. 4) per CB will be mainly described.

In FIG. 5, assume that CBs #1 to #4 in which TBs are divided are grouped by two CBs at a time, forming CBG #1 and CBG #2. Even when CBGs are formed, encoding and rate matching are performed for each CB.

As shown in FIG. 5, the radio base station assigns HARQ processes per CBG, not per TB. In FIG. 5, as in FIG. 4, the radio base station assigns multiple HARQ processes per subframe, instead of assigning one HARQ process per subframe. The radio base station may include the HPN of each of the plurality of HARQ processes in DCI (DL assignment) that allocates the DL signal including the plurality of CBGs. Furthermore, the radio base station may include at least one of the CBG index, the NDI, and the RV for each HPN, in the DCI.

For example, in FIG. 5, HARQ processes of HPN=0 and 1 are assigned to CBG #1, which includes CBs #1 and #2, and to CBG #2, which includes CBs #3 and #4. Therefore, DCI allocating DL signals including CBG #1 and #2 may indicate HPN=0 and 1. Furthermore, the DCI may indicate that the CBG indices of HPN=0 and 1 are "#1" and "#2," respectively. Also, since CBG #1 and #2 are in the initial transmission, the DCI may indicate that all NDIs of HPN=0 and 1 are toggled and that all RVs of HPN=0 and 1 are "0."

Also, the user terminal decodes each CB in each CBG based on at least one of the CBG index, the NDI and the RV of each HPN, included in DCI. The user terminal may perform error detection of each CB based on the CRC bits respectively appended to each CB.

In addition, the user terminal generates retransmission control information indicating an A/N for each CBG based on the error detection result of each CB in each CBG. For example, in FIG. 5, the user terminal succeeds in decoding CBs #1, #2, and #4 and fails to decode CB #3. Therefore, the user terminal generates retransmission control information, which represents an ACK for CBG #1 including CBs #1 and #2, and a NACK for CBG #2 including CBs #3 and #4, and feeds back the retransmission control information to the radio base station. Thus, in retransmission control in CBG units, if at least one CB in a CBG results in a NACK, the whole CBG results in a NACK.

The radio base station generates DL signals based on retransmission control information that is fed back from the user terminal. For example, in FIG. 5, since retransmission control information indicates a NACK in response to CBG #2, at the time of HPN=1, the radio base station needs to retransmit CBs #3 and #4 included in CBG #2. Meanwhile, since retransmission control information represents an ACK in response to CBG #1, the radio base station can allocate new data to HPN=0.

Here, the radio base station transmits retransmitted CBs #3 and #4 of HPN=1 and new data of HPN=0 by multiplexing. Note that the radio base station may apply different RVs to retransmitted CBs #3 and #4 than those of CBs #3 and #4 upon the initial transmission. Also, in FIG. 5, code block segmentation is not applied to the new data, but code block segmentation may also be applied.

For example, in FIG. 5, HPN=0 and 1 may be indicated in DCI allocating a DL signal including retransmitted CBG #2 (that is, CBs #3 and #4) and new data. Also, the DCI may indicate that the CBG index of HPN=1 is "#2," and the NDI of HPN=1 is not toggled and the RV of HPN=1 is "2." Furthermore, the DCI may indicate that the NDI of HPN=0 is toggled, and the RV is "0." [0067] Since the NDI of HPN=1 in the DCI is not toggled and the CBG index of HPN=1 is "#2," the user terminal can recognize that the CBG #2 (that is, CBs #3 and #4) has been retransmitted with HPN=1. Furthermore, the user terminal can decode CBs #3 and #4 based on the RV "2" of HPN=1 in DCI.

Also, since the NDI of HPN=0 in DCI is toggled and no CBG index is included, the user terminal can recognize that new data, to which code block segmentation is not applied, has been transmitted at HPN=0. Furthermore, the user terminal can decode new data based on RV "0" of HPN=0 in DCI.

As described above, when retransmission control is performed in units of CBGs of the DL signal, when dividing a TB into multiple CBs, the user terminal can retransmit only CBGs including CBs that have failed to be decoded. Accordingly, the user terminal can improve the efficiency of the use of radio resources without having to retransmit the whole TB that includes CBs that have been decoded successfully.

Furthermore, when retransmission control is performed in units of CBGs with respect to a DL signal, the number of HARQ processes to be used can be reduced compared to the case where retransmission is controlled in units of CBs. Therefore, even when the number of CBs per TB is larger than the maximum number of HARQ processes, the user terminal can perform retransmission control in units of CBG. Also, it is possible to reduce at least one of the amount of DCI information and the amount of A/N information compared to retransmission control in CB units.

<Maximum Number of HARQ Processes>

Next, the maximum number of HARQ processes (maximum value of HPN) used for retransmission control per CB or CBG will be described. As explained in FIG. 4 and FIG. 5, HARQ processes are allocated in units of CBs or in units of CBGs.

The maximum number of HARQ processes assigned in units of CBs or in units of CBGs may be changed based on the number of CBs or CBGs per TB. For example, regarding the maximum number of HARQ processes, depending on the number of CBs or CBGs per TB, the maximum number of HARQ processes allocated per TB (for example, 8) may be increased.

Alternatively, the maximum number of HARQ processes assigned per CB or per CBG may be equal to the maximum number (for example, 8) of HARQ processes assigned per TB.

Alternatively, the maximum number of HARQ processes assigned per CB or per CBG may be changed based on at least one of the direction of communication (UL or DL) and configurations (for example, UL time interval or DL time interval allocation configuration, TDD configuration).

Note that the radio base station may decide whether to assign HPNs in units of CBs or in units of CBGs (that is, whether the unit of retransmission is CB or CBG) based on the maximum number of HARQ processes and the number of CBs per TB. For example, if the number of CBs per TB is equal to or less than the maximum number of HARQ processes, HPNs are given on a per CB basis, and if the number of CBs per TB is greater than the maximum number of HARQ processes, HPNs may be given on a per CBG basis.

As described above, by configuring the maximum number of HARQ processes, even when not only TBs but also CBs and/or CBGs are supported as units for assigning HARQ processes, retransmission control can be appropriately performed.

<Signaling of Retransmission Unit Information>

Next, the signaling of the retransmission unit information will be explained. Here, the retransmission unit information refers to information that relates to the unit of retransmission, and may indicate, for example, at least one of whether or not code block segmentation is applied, the unit of retransmission (for example, whether the unit of retransmission is CB or CBG, or whether it is one of CB, CBG or TB), supported retransmission units, (for example, TB only, or CB, CBG and TB), the size of a CB, the size of a CBG, the number of CBs per TB, the number of CBGs per TB, and the number of CBs per CBG. The retransmission unit information may be signaled implicitly or may be signaled explicitly.

(1) Implicit Signaling

The user terminal may identify the retransmission unit information based on at least one of numerology, the frequency band, the cell (component carrier), the TBS, and the maximum number of HARQ processes. Here, the numerology is a communication parameter in the frequency direction and/or the time direction, and may be, for example, at least one of subcarrier spacing, bandwidth, symbol duration, the time duration of CPs (CP duration), the time duration of subframes, the time duration (TTI duration) of transmission time intervals (TTIs), the number of symbols per TTI, the radio frame configuration, the filtering process, the windowing process, and so on.

For example, the user terminal may judge whether code block segmentation is applied in a specific frequency band. Also, the user terminal may judge whether code block segmentation is applied depending on whether or not the TBS exceeds a predetermined threshold or not. Also, the user terminal may judge which of CB or CBG is the unit of retransmission based on the number of CBs per TB and the maximum number of HARQ processes.

(2) Higher Layer Signaling

Alternatively, the retransmission unit information may be indicated to the user terminal by high layer signaling from the radio base station (for example, by using at least one of RRC (Radio Resource Control) signaling, the MIB (Master Information Block) and SIBs (System Information Blocks)).

Higher layer signaling of retransmission unit information may be periodic or aperiodic. Every time the above retransmission unit information is indicated, the user terminal may change the retransmission unit, or may use the designated retransmission unit fixedly.

For example, the retransmission units supported by user terminals (for example, TBs only, or CBs, CBGs and TBs) may be reported from the radio base station to the user terminal as capability information (UE capability) (or may be reported from the user terminal to the radio base station).

(3) Physical Layer Signaling (DCI)

Alternatively, the retransmission unit information may be indicated to the user terminal by DCI from the radio base station. For example, DCI (DL assignment) to allocate a DL signal may include information indicating whether code block segmentation is applied to the subframe where the DL signal is allocated (and its subsequent subframes may be included as well). Likewise, DCI (UL grant) to allocate a UL signal may include information to indicate whether code block segmentation is applied to the subframe where the UL signal is allocated (and its subsequent subframes may be included as well).

As described above, by signaling the retransmission unit information implicitly or explicitly, even when not only TB but CB and/or CBG are supported as retransmission units, the user terminal can appropriately perform retransmission control.

<Maximum Number of Transmissions in Each HARQ Process>

Next, the maximum number of transmissions in each HARQ process assigned in units of CBs or in units of CBGs will be explained. The maximum number of transmissions in each HARQ process assigned in units of CBs or CBGs may be the same as the maximum number of transmissions in each HARQ process assigned in units of TBs (for example, eight times), or may be different.

Also, the maximum number of retransmissions in each HARQ process assigned in units of CBs or in units of CBGs may be scaled depending on the number of CBs or CBGs per TB. For example, if the maximum number of transmissions in each HARQ process assigned per TB is 8 and the number of CBs (or the number of CBGs) per TB is 2, the maximum number of transmissions of CB or CBG in each HARQ process assigned for each CB or CBG may be 4 (=8/2). In this case, CB #2 of HPN=1 in FIG. 4, after its initial transmission, is retransmitted three times unless an ACK is received.

Also, apart from the maximum number of transmissions in each HARQ process assigned per TB, the maximum number of transmissions in each HARQ process assigned per CB or per CBG may be configured. Also, the maximum number of transmissions in each HARQ process in CB units and the maximum number of transmissions in each HARQ process in CBG units may be configured in common or may be configured separately.

As described above, by configuring the maximum number of transmissions in each HARQ process, even when not only TB but CB and/or CBG are supported as a unit for assigning HARQ process, retransmission control can be appropriately performed.

<Retransmission Control Information>

Next, retransmission control information representing A/Ns per CB or CBG will be described in detail. This retransmission control information may be a bitmap (example of first configuration) comprised of a number of bits equal to the number of CBs or CBGs per TB, or may be pattern information that represents a predefined combination of ACKs or NACKs for each CB or CBG (example of the second configuration).

FIG. 6 is a diagram to show an example of the first configuration of the retransmission control information according to the first aspect. As shown in FIG. 6, the retransmission control information is a bitmap comprised of a number of bits equal to the number of CBs or the number of CBGs, and may represent A/Ns for CBs or CBGs corresponding to each bit. FIG. 6 illustrate retransmission control information indicating A/N for each CB. The retransmission control information representing A/Ns for each CBG may be configured by changing the CB in FIG. 6 to CBGs.

For example, when the number of CBs per TB is four (C=4), the retransmission control information may be a four-bit bitmap, as shown in FIG. 6A. In FIG. 6A, assume that the first to fourth bits from the left correspond to CB #1 to CB #4 respectively, and the value (0 or 1) of each bit represents A/N in response to each CB. For example, as illustrated in FIG. 4, if the user terminal succeeds in decoding CBs #1, #3, and #4 and fails to decode CB #2, the bitmap "1011" is fed back to the radio base station as retransmission control information.

When the number of CBs per TB is six (C=6), as shown in FIG. 6B, the retransmission control information may be a six-bit bitmap. In FIG. 6B, assume that the first to sixth bits from the left correspond to CB #1 to CB #6, respectively, and the value (0 or 1) of each bit represents A/N in response to each CB.

In the above example of the first configuration, retransmission control information is constituted by a number of bits equal to the number of CBs or the number of CBGs per TB, so that can show all combinations of A/N for each CB or for each CBG. Meanwhile, it is necessary to reserve a number of bits for retransmission control information to match the number of CBs or CBGs per TB, and overhead may increase.

FIG. 7 is a diagram to show an example of the second configuration of the retransmission control information according to the first aspect. As shown in FIG. 7, the retransmission control information may be pattern information indicating predefined combinations of A/Ns of each CB or CBG. In FIG. 7, retransmission control information representing A/N for each CB will be exemplified. The retransmission control information representing A/N for each CBG may be configured by changing the CBs in FIG. 7 to CBGs.

For example, if the number of CBs per TB is four (C=4), as shown in FIG. 7A, combinations (1) to (8) of A/Ns of CB #1 to CB #4 are defined in advance, and these combinations (1) to (8) may be expressed by pattern information of three bits. Note that the following combinations (1) to (8) are only examples, and combinations defined in advance are not limited to these combinations.

(1) NACKs for all of CBs #1 to #4
(2) NACKs for CBs #1 and #2 and ACKs for CBs #3 and #4
(3) ACKs for CBs #1 and #2 and NACKs for CBs #3 and #4
(4) ACKs for CBs #1 to #3 and a NACK for CB #4
(5) ACKs for CBs #1, #2 and #4 and a NACK for CB #3
(6) ACKs for CBs #1, #3 and #4 and a NACK for CB #2
(7) A NACK for CB #1 and ACKs for CBs #2 to #4
(8) ACKs for all CBs #1 to #4

In the case shown in FIG. 7A, The user terminal transmits pattern information indicating a combination matching the decoding results of CB #1 to CB #4 as retransmission control information. For example, as described in FIG. 4, when the user terminal succeeds in decoding CBs #1, #3, and #4 and fails to decode CB #2, the pattern information "101" indicating the combination (6) is retransmission control information as feedback to the radio base station.

Meanwhile, when a combination matching the decoding result of each of CBs #1 to #4 is not defined here (for example, an ACK is returned in response to CB #1 and #4 and NACK is returned in response to CB #2 and #3), the user terminal may transmit pattern information "000," which indicates the combination (1), as retransmission control information, and request all retransmissions of CBs #1 to #4.

Also, if the number of CBs per TB is six (C=6), as shown in FIG. 7B, combinations (1) to (8) of A/Ns in response to CBs #1 to #6 are predefined the combinations (1) to (8) may be represented by 3-bit pattern information. Note that the following combinations (1) to (8) are only examples, and combinations defined in advance are not limited to these combinations.

(1) NACKs for all of CBs #1 to #6
(2) ACKs for CBs #1 to #5, and an ACK for CB #6
(3) ACKs for CBs #1 to #4 and #6, and a NACK for CB #5
(4) ACKs for CBs #1 to #3, #5 and #6, and a NACK for CB #4
(5) ACKs for CB #1, #2, #4 to #6, and a NACK for CB #3
(6) ACKs for CB #1, #3 to #6 and a NACK for CB #2
(7) A NACK for CB #1, and ACKs for CBs #2 to #6
(8) ACKs for all of CBs #1 to #6

In the case shown in FIG. 7B, the user terminal transmits pattern information indicating a combination matching the error detection result of CBs #1 to #6 as retransmission control information. When a combination matching the decoding result of CBs #1 to #6 is not defined (for example, in the event NACKs are returned in response to two CBs, three CBs, four CBs or five CBs out of CBs #1 to #6), the user terminal may transmit the pattern information "000," which indicates the combination (1), and in which all of CB #1 to CB #6 are NACK as retransmission control information, and requests retransmission of all of CBs #1 to CB #6.

In the above example of the second configuration, since the retransmission control information is comprised of pattern information indicating predefined combinations of A/Ns of each CB or CBG, so that the number of bits for retransmission control information can be reduced compared to the example of the first configuration (FIG. 6) by predefining the combination of A/N of each CB or each CBG. In particular, by prescribing a combination in which NACK is returned only for a single CB as pattern information, it becomes possible to retransmit only that single CB, so that the efficiency of the use of radio resources can be improved.

As described above, according to the first aspect, retransmission of DL signals is controlled in smaller units than TBs (for example, in CB units or in CBG units), so that it is not necessary to retransmit whole TBs, and the efficiency of the use of radio resources can be improved.

(Second Aspect)

In the second aspect, retransmission control of UL signals will be described. When the transport block (TB) of the UL signal is divided into multiple code blocks (CBs), the user terminal according to the second aspect controls retransmission of the UL signal for each CB or for each CBG which groups fewer CBs than the above multiple CBs. In the second aspect, differences from the first aspect will be mainly explained, and descriptions of the same contents as those of the first aspect will be omitted.

<Retransmission Control in Units of CBs>

Figure 8:
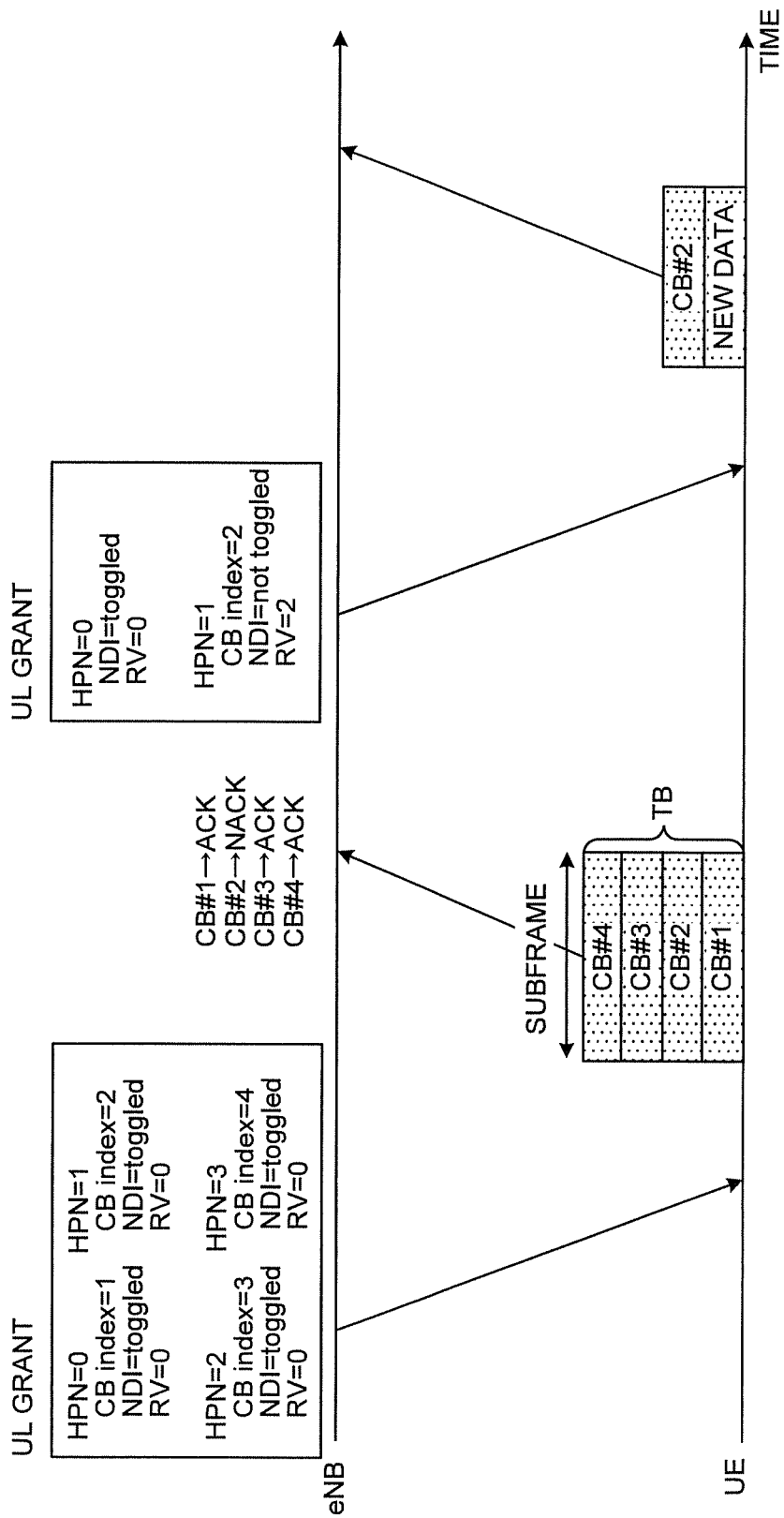
FIG. 8 is a diagram to show an example of retransmission control per CB according to a second aspect of the present invention.

FIG. 8 is a diagram to show an example of retransmission control in units of CBs according to the second aspect. Note that FIG. 8 shows a case where one TB is divided into four CBs (CBs #1 to #4) as an example, but the number of CBs per TB is not limited to this.

As shown in FIG. 8, If the size of the TB (TBS) (information bit sequence including CRC bits) exceeds the predetermined threshold (for example, 6144 bits), the radio base station (eNB) decides to divide the TB into C (C>1) CBs (CBs #1 to #4 in this case).

In FIG. 8, the radio base station assigns a HARQ process for each CB, not for each TB. The radio base station generates DCI (UL grant) including at least one of the HPN of each HARQ process, the index of the CB assigned to each HARQ process, the NDI of each HARQ process, and the RV of each HARQ process and transmits it to the user terminal.

For example, in FIG. 8, HARQ processes of HPN=0, 1, 2 and 3 are assigned to CB #1, #2, #3 and #4, respectively. Therefore, DCI allocating UL signals including CBs #1 to #4 may indicate HPN=0, 1, 2 and 3. Furthermore, the DCI may indicate that the CB indices of HPN=0, 1, 2 and 3 are "#1," "#2," "#3," and "#4," respectively. Also, since CBs #1 to #4 are in the initial transmission, the DCI may indicate that all NDIs of HPN=0, 1, 2, and 3 are toggled and that all RVs of HPN=0, 1, 2, and 3 are "0."

Based on the DCI, the user terminal divides the TB into CB #1 to CB #4, adds CRC bits (for example, 24 bits) to each of CB #1 to CB #4, and performs channel encoding (for example, turbo coding) and rate matching for each CB at a predetermined coding rate (for example, ⅓). CBs #1 to #4 after rate matching are coupled as CW, scrambled and modulated, and mapped in one subframe (see FIG. 1).

The radio base station demodulates the UL signal including CBs #1 to #4 and decodes each CB based on at least one of the CB index of each HPN, the NDI and the RV. The radio base station may perform error detection of each CB based on the CRC bits added to each CB.

In addition, the radio base station detects the A/N for each CB based on the decoding result of each CB. For example, in FIG. 8, the radio base station succeeds in decoding CBs #1, #3, and #4 and fails to decode CB #2. In this case, the radio base station needs to request retransmission of CB #2 of HPN=1, while requesting transmission of new data of HPN=0, 2, and 3.

Therefore, the radio base station requests retransmission of CB #2 at HPN=1, the radio base station may generate the DCI (UL grant) with the HPN=1 NDI not toggling, the CV index of HPN=1 as #2, and the RV of HPN=1 as "2." In addition, since the radio base station requests the initial transmission of new data of HPN=0 in the same subframe as retransmitted CB #2, the radio base station may toggle the NDI of HPN=0 in the DCI and set the RV of HPN=0 to "0." In FIG. 8, assume that code block segmentation is not applied to new data, but code block segmentation may also be applied.

Since the NDI of HPN=1 in the DCI is not toggled and the CB index of HPN=1 is "#2," the user terminal can recognize that retransmission of CB #2 is requested with HPN=1. Furthermore, the user terminal may perform rate matching of retransmitted CB #2 based on RV "2" of HPN=1 in DCI.

Also, since the NDI of HPN=0 in DCI is toggled and CB index is not included, the user terminal can recognize that transmission of new data to which code block segmentation is not applied is requested of HPN=0. Furthermore, the user terminal may perform rate matching of new data based on RV "0" of HPN=0 in DCI.

As described above, in the case of performing retransmission control on a CB basis for the UL signal, when dividing the TB into a plurality of CBs, the user terminal can retransmit only CBs that have failed to be decoded. Therefore, the user terminal can improve the efficiency of the use of radio resources without having to retransmit the entire TB that includes CBs that have been decoded successfully.

<Retransmission Control in Units of CBGs>

Figure 9:
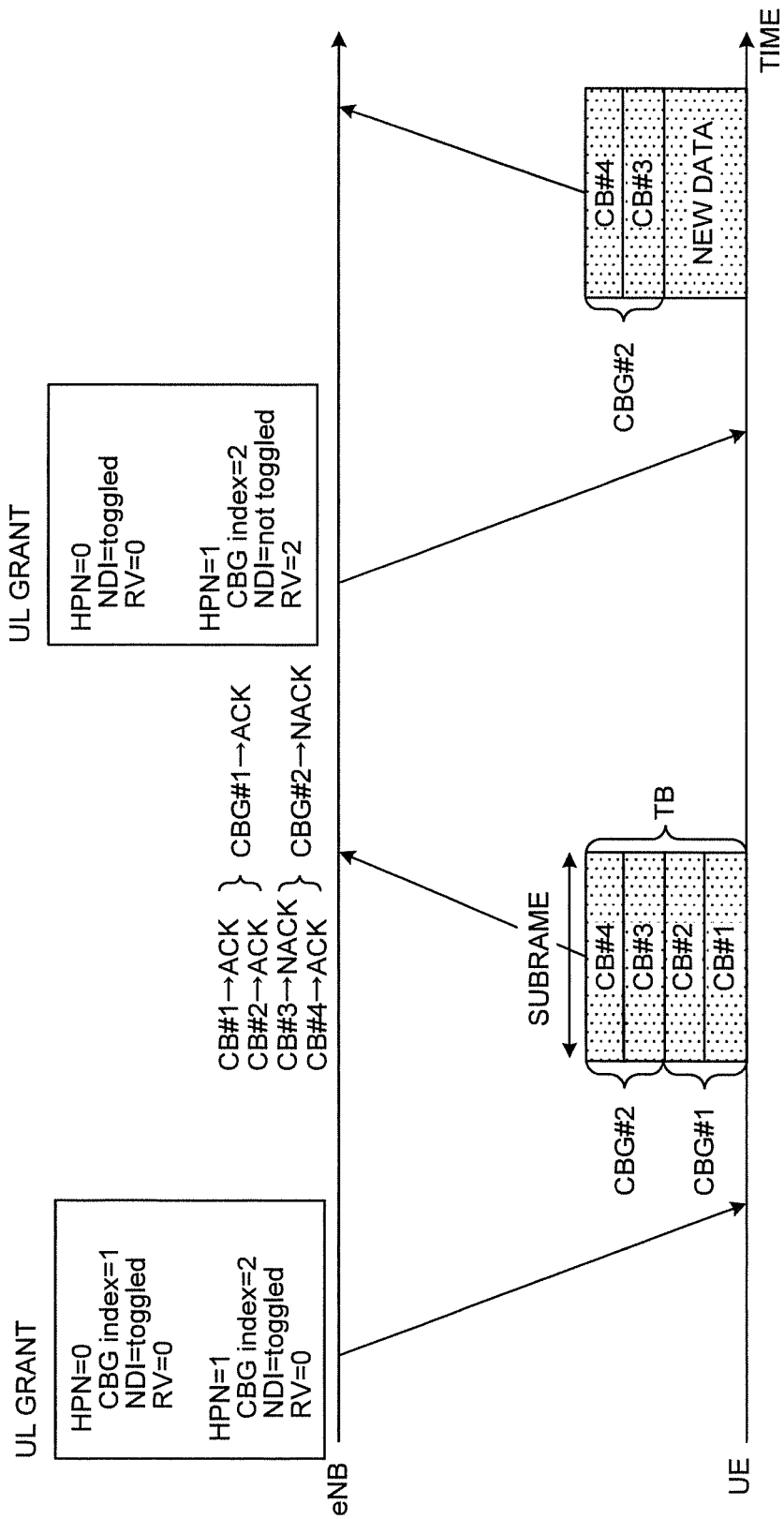
FIG. 9 is a diagram to show an example of retransmission control per CBG according to the second aspect.

FIG. 9 is a diagram to show an example of retransmission control in units of CBGs according to the second aspect. FIG. 9 shows a case where one TB is divided into four CBs (CBs #1 to #4) as an example, but the number of CBs per TB is not limited to this. Also, in FIG. 9, two CBs are grouped into a CBG, but the number of CBs per CBG is not limited to this. And the following explanation mainly focuses on differences from retransmission control in units of CBs (for example, FIG. 8).

In FIG. 9, the radio base station assigns a HARQ process per CBG, not per TB. The radio base station generates DCI (UL Grant) including at least one of the HPN of each HARQ process, the index of CBG assigned to each HARQ process, the NDI of each HARQ process, the RV of each HARQ process and transmits it to the user terminal.

For example, in FIG. 9, HARQ processes of HPN=0 and 1 are assigned to CBG #1 including CBs #1 and #2 and CBG #2 including CBs #3 and #4, respectively. Therefore, DCI allocating UL signals including CBs #1 to #4 may indicate HPN=0 and 1. Furthermore, the DCI may indicate that the CBG indices of HPN=0 and 1 are "#1" and "#2," respectively. Also, since CBGs #1 and #2 are in the initial transmission, the DCI may indicate that all NDIs of HPN=0 and 1 are toggled and that all RVs of HPN=0 and 1 are "0."

Based on the DCI, the user terminal divides the TB into CBs #1 to #4 and adds CRC bits (for example, 24 bits) to each of CBs #1 to #4. Then, the user terminal performs channel encoding (for example, turbo coding) and rate matching for each CB at a predetermined coding rate (for example, ⅓) CBs #1 to #4 after rate matching are coupled as CW, scrambled and modulated, and mapped in one subframe (see FIG. 1).

The radio base station demodulates UL signal including CBs #1 to #4 and decodes each CB in each CBG based on at least one of the CBG index, the NDI and the RV of each HPN. The radio base station may perform error detection of each CB in each CBG based on the CRC bits respectively appended to the CBs.

In addition, the radio base station detects the A/N for each CBG based on the decoding result of each CB in each CBG. For example, in FIG. 9, the radio base station succeeds in decoding CBs #1, #2 and #4 and fails to decode CB #3. For this reason, the radio base station needs to request retransmission of CBG #2 including CB #3 of HPN=1, while requesting transmission of new data of HPN=0.

Therefore, in order to request retransmission of CBG #2 at HPN=1, the radio base station may generate DCI (UL grant), without toggling the NDI of HPN=1, making the CBG index of HPN=1 be #2, and making the RV of HPN=1 be "2." Furthermore, since the radio base station requests the initial transmission of new data of HPN=0 in the same subframe as the retransmission CBG #2, the radio base station may toggle the NDI of HPN=0 in the above DCI and set the RV of HPN=0 to "0." In FIG. 9, code block segmentation is not applied to new data, but code block segmentation may be applied.

Since the NDI of HPN=1 in the DCI is not toggled and the CBG index of HPN=1 is "#2," the user terminal can recognize that retransmission of CBs #3 and #4 in CBG #2 is requested of HPN=1. Furthermore, the user terminal may perform rate matching of retransmission CBs #3 and #4 based on RV "2" of HPN=1 in DCI.

Also, since the NDI of HPN=0 in DCI is toggled and no CBG index is included, the user terminal can recognize that transmission of new data to which code block segmentation is not applied is requested of HPN=0. Furthermore, the user terminal may perform rate matching of new data based on RV "0" of HPN=0 in DCI.

As described above, when performing retransmission control on a CBG basis for the UL signal, when dividing a TB into multiple CBs, the user terminal can retransmit only CBGs including CBs that have failed to be decoded. Accordingly, the user terminal can improve the efficiency of the use of radio resources without having to retransmit the whole TB that includes CBs that have been decoded successfully.

Also, when retransmission control is performed in units of CBGs of the UL signal, the number of HARQ processes to be used can be reduced compared to the case where retransmission performed in units of CBs. Therefore, even when the number of CBs per TB is larger than the maximum number of HARQ processes, it is possible to perform retransmission control in units of CBGs. Also, it is possible to reduce at least one of the amount of DCI information and the amount of A/N information compared to retransmission control in units of CBs.

(Others)

In the second aspect, since the maximum number of HARQ processes (maximum value of HPN) used for retransmission control per CB or CBG, signaling of retransmission unit information, the maximum number of transmissions in each HARQ process assigned in units of CBs or in units of CBGs are the same as in the first aspect, explanation will be omitted.

In a second aspect, the radio base station may omit transmission of retransmission control information representing A/N for each CB or A/N for each CBG, and may indicate whether or not retransmission is requested by NDI of each HARQ process. Alternatively, the radio base station may transmit retransmission control information configured as described in the first aspect.

As described above, according to the second aspect, retransmission of UL signals is controlled in smaller units than TBs (for example, in CB units or in CBG units), so that there is no need to retransmit whole TBs, and the efficiency of the use of radio resources can be improved.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 10:
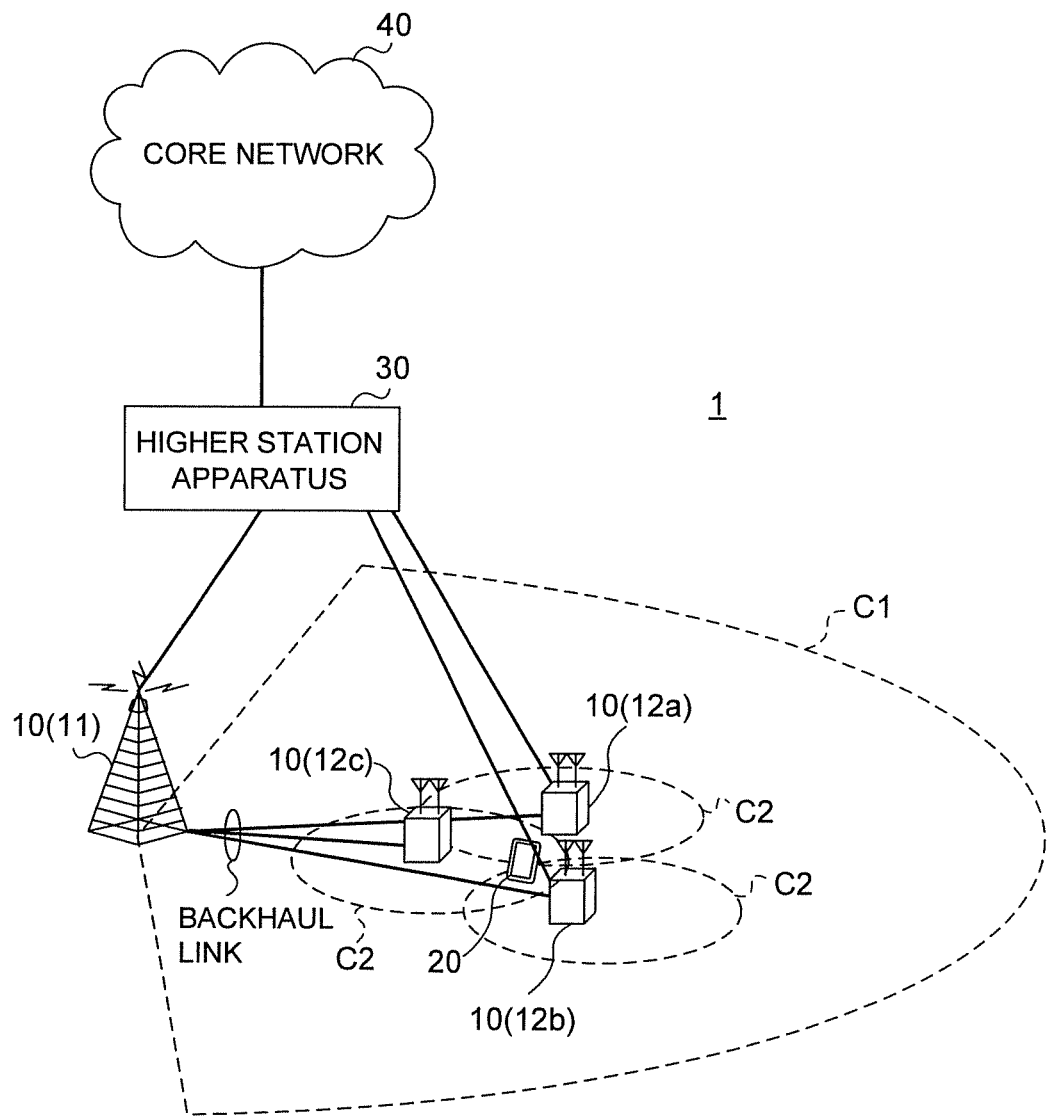
FIG. 10 is a diagram to show an example of a schematic structure of a radio communication system according to the present embodiment.

FIG. 10 is a diagram to show an example of a schematic structure of a radio communication system according to present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 10 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

In each cell (carrier), either one of a subframe having a relatively long time duration (also referred to as a "TTI," a "normal TTI," a "long TTI," a "normal subframe," a "long subframe," etc.) (for example, 1 ms), or a subframe having a relatively short time duration (also referred to as a "short TTI," a "short subframe," etc.) may be applied, or both long subframes and short subframe may be used. Furthermore, in each cell, subframes of two or more time durations may be applied.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL. SC-FDMA can also be applied a side link (SL) that is used in inter-terminal communication.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Blocks) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH retransmission control information (A/Ns, HARQ-ACKs, etc.) can be communicated in at least one of the PHICH, the PDCCH and the EPDCCH.

In the radio communication system 1, UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of PDSCH retransmission control information (A/Ns, HARQ-ACKs, etc.), channel state information (CSI) and so on, is communicated in the PUSCH or the PUCCH. By means of the PRACH, random access preambles for establishing connections with cells are communicated.

<Radio Base Station>

Figure 11:
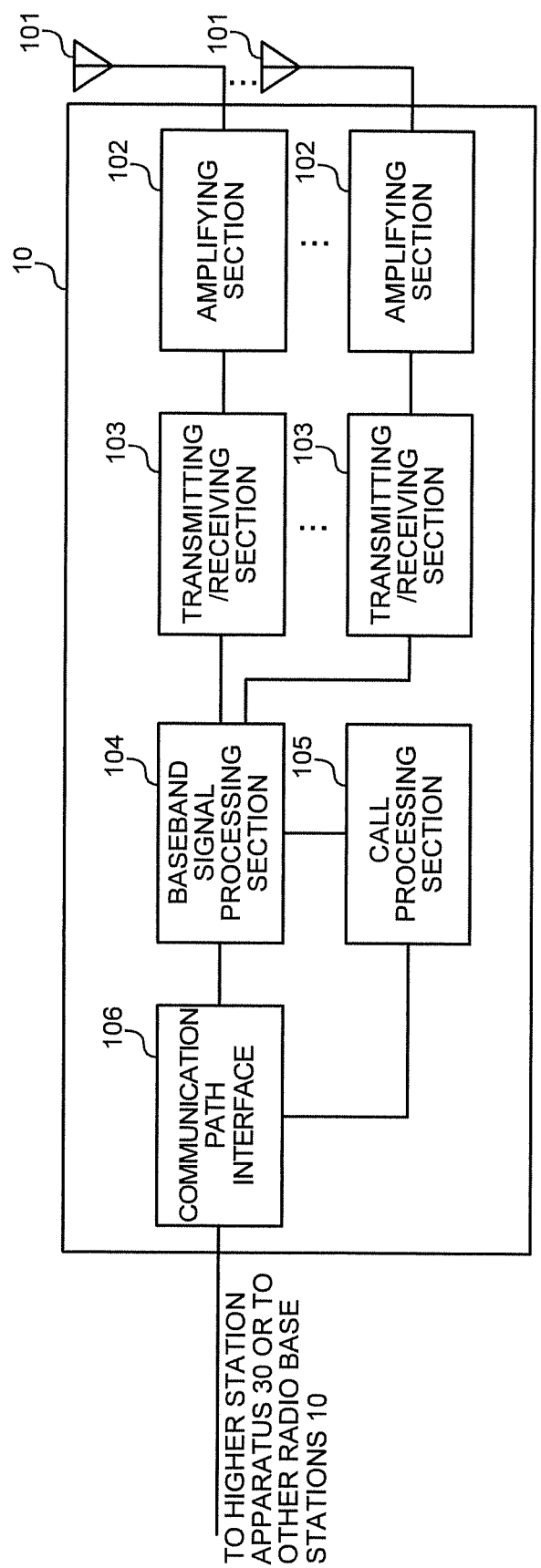
FIG. 11 is a diagram to show an example of an overall structure of a radio base station according to the present embodiment.

FIG. 11 is a diagram to show an example of an overall structure of a radio base station according to present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 203 transmit DL signals (for example, at least one of DCI (DL assignment and/or UL grant), DL data and DL reference signals), and receive UL signals (for example, at least one of UL data, UCI and UL reference signals).

In addition, the transmitting/receiving section 103 may receive retransmission control information indicating A/N for each CB or A/N for each CBG of the DL signal, and may transmit retransmission control information indicating A/N for each CB or CBG of the UL signal. Furthermore, the transmitting/receiving section 103 may transmit retransmission unit information.

Figure 12:
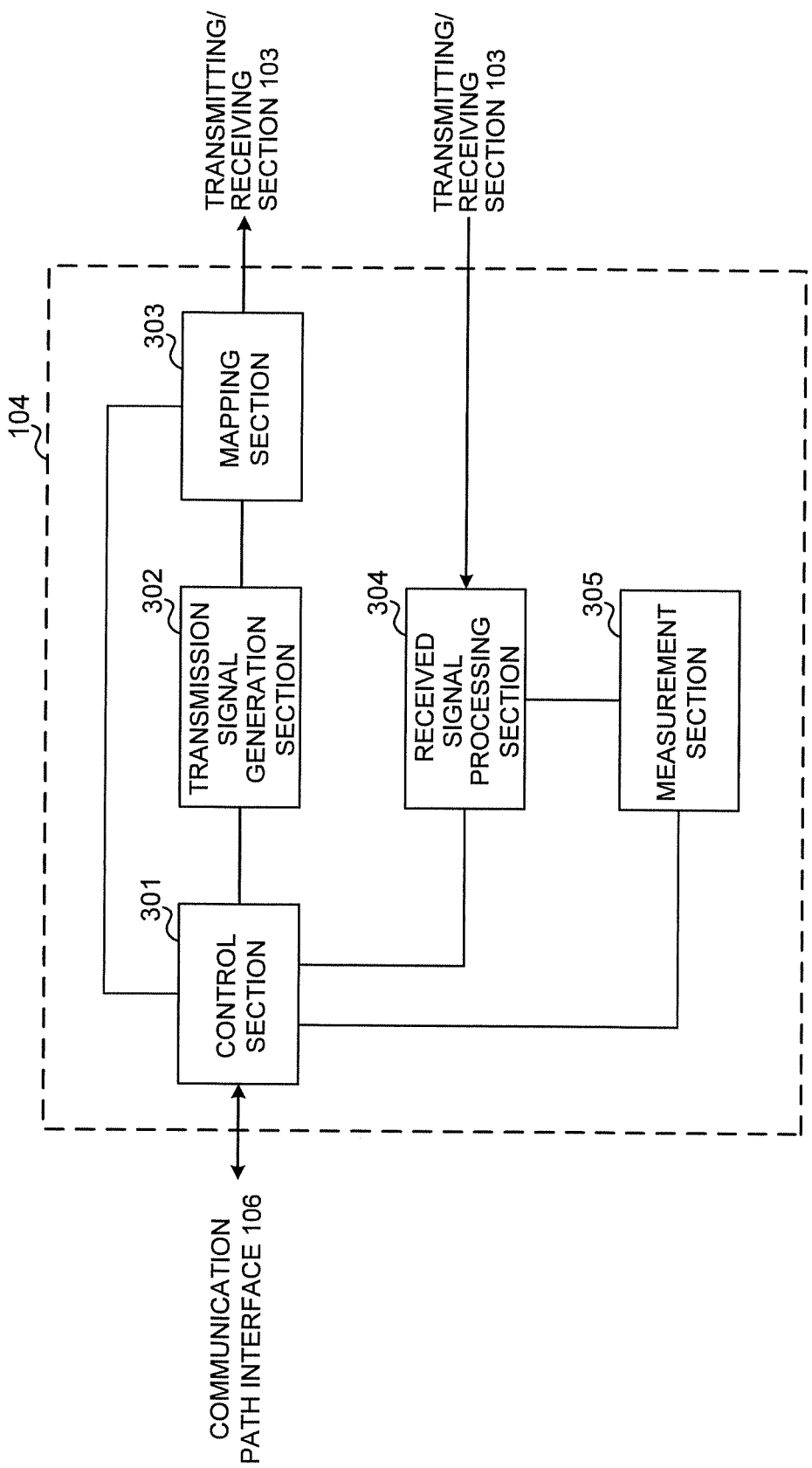
FIG. 12 is a diagram to show an example of a functional structure of a radio base station according to the present embodiment.

FIG. 12 is a diagram to show an example of a functional structure of a radio base station according to present embodiment. Note that, although FIG. 12 primarily shows functional blocks that pertain to characteristic parts of the present embodiment, the radio base station 10 has other functional blocks that are necessary for radio communication as well. As shown in FIG. 12, the baseband signal processing section 104 has a control section 301, a transmission signal generation section 302, a mapping section 303, a received signal processing section 304 and a measurement section 305.

The control section 301 controls the whole of the radio base station 10. The control section 301 controls DL signal generation processes by the transmission signal generation section 302 (for example, encoding, modulation, etc.), mapping of DL signals by the mapping section 303, UL signal receiving processes by the received signal processing section 304 (for example, demodulation, decoding, etc.), and measurements by measurement section 305.

To be more specific, the control section 301 determines the modulation scheme and TBS of a DL signal based on a channel quality indicator (CQI) that is fed back from a user terminal 20. The control section 301 controls the transmission signal generating section 302 to encode the DL signal based on the TBS and modulate the DL signal based on the modulation scheme.

Also, when the TBS exceeds a predetermined threshold, the control section 301 may apply code block segmentation to the DL signal, whereby the TBS is divided into multiple CBs. To be more specific, the control section 301 may control the transmission signal generation section 302 to perform encoding and rate matching per CB, and control the mapping section 303 to map a CW, in which each CB is connected.

Also, when the TB of a UL signal is divided into a plurality of CBs, the control section 301 may control the retransmission of DL signals for each CB, or for each CBG grouping fewer code blocks than these plurality of CBs (FIG. 4 and FIG. 5).

For example, the control section 301 determines whether or not to retransmit CB or CBG in each HARQ process based on retransmission control information indicating A/N for each CB or A/N for each CBG from the user terminal 20. In addition, the control section 301 may control the transmission signal generation section 302 and the mapping section 303 so as to transmit retransmission CB or retransmission CBG and the new data in the same DL signal (FIG. 4 and FIG. 5).

Also, the control section 301 controls UL signal receiving processes (for example, demodulation, decoding, etc.). For example, the control section 301 may demodulate a UL signal based on a modulation scheme indicated by an MCS index specified in DCI (UL grants), determine the TBS based on the TBS index indicated by the MCS index and the number of allocated resource blocks, and control the received signal processing section 304 to decode DL signals based on this TBS.

Also, when the transport block (TB) of the UL signal is divided into a plurality of code blocks (CBs), the control section 301 may request the retransmission of the UL signal per CB or per code block group (CBG) formed by grouping fewer CBs than the plurality of CBs (second aspect, FIG. 8 and FIG. 9). For example, the control section 301 may request retransmission on a CB or CBG basis, depending on the NDI value for each HPN in the UL grant.

HARQ processes for use for retransmission control of DL signals and/or UL signals in units of CBs or CBGs as described above are assigned per CB or per CBG. The maximum number of HARQ processes may be equal to or different from the maximum number of HARQ processes assigned per TB (may be different between DL and UL). Also, the maximum number of transmissions in each HARQ process may be equal to or different from the maximum number of transmissions in each HARQ process assigned for each TB.

In addition, the control section 301 may control the retransmission unit (for example, either CB or CBG, CB, CBG or TB). The control section 301 may control the transmission signal generation section 302 and the mapping section 303 so as to transmit information on the retransmission unit by at least one of higher layer signaling, DCI and capability information of the user terminal.

The control section 301 can be constituted by a controller, a control circuit or control apparatus that can be described based on general understanding of the technical field to which the present invention pertains.

The transmission signal generation section 302 may generate a DL signal (including at least one of DL data, DCI and DL reference signals) and/or retransmission unit information based on a command from the control section 301 and output it to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs receiving processes (for example, demapping, demodulation, decoding and so on) of uplink signals that are transmitted from the user terminals 20. For example, the received signal processing section 304 may perform the decoding process in CB units, according to commands from the control section 301.

To be more specific, the received signal processing section 304 may output the received signals, the signals after the receiving process and so on, to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 13:
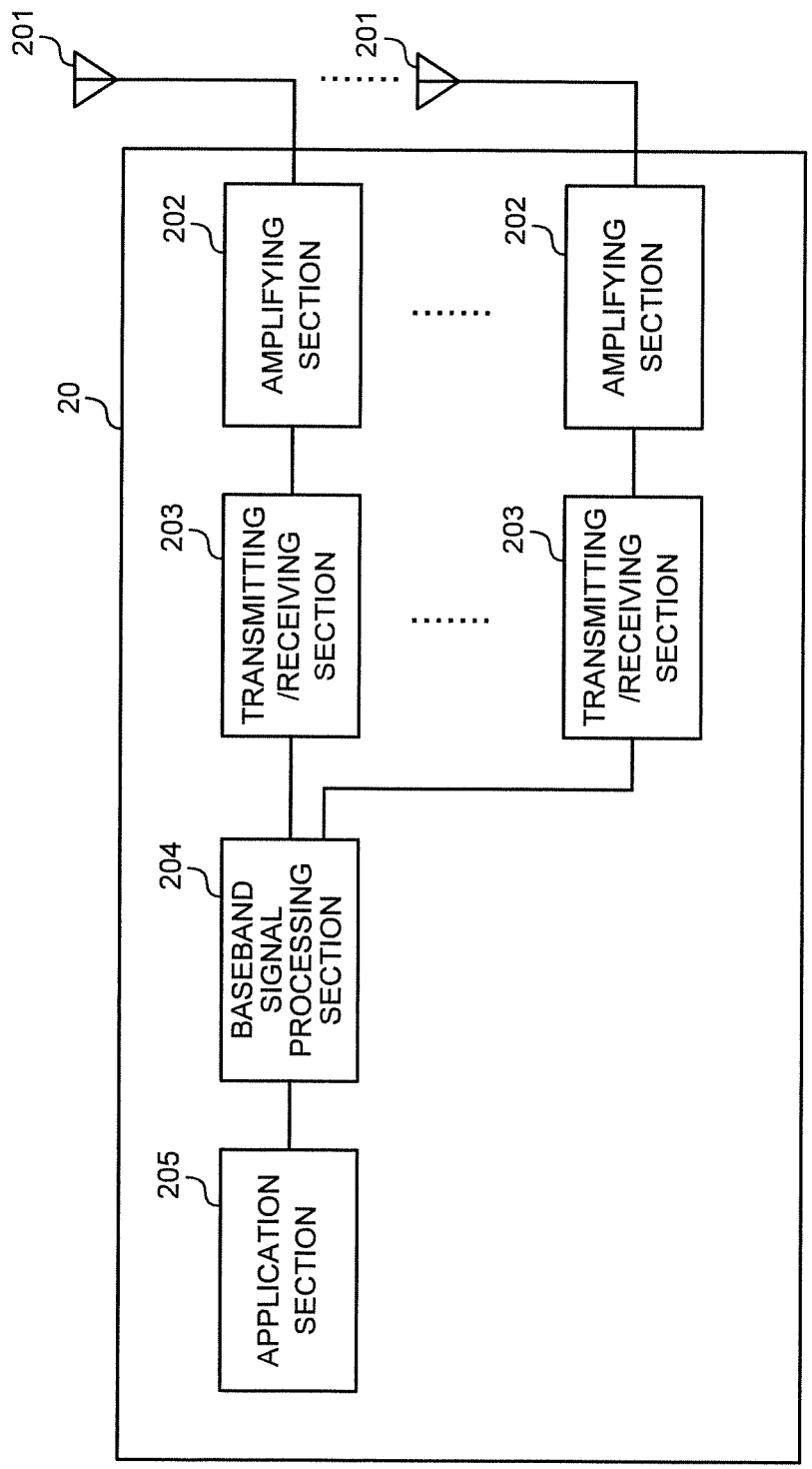
FIG. 13 is ma diagram to show an example of an overall structure of a user terminal according to the present embodiment.

FIG. 13 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, at least one of retransmission control information for DL signal, channel state information (CSI), scheduling request (SR), etc.) is also subjected to channel coding, rate matching, puncturing, DFT processing, IFFT processing and so on, and forwarded to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive DL signals (for example, at least one of DCI (DL assignment and/or UL grant), DL data and DL reference signals), and transmit UL signals (for example, at least one of UL data, UCI and UL reference signals).

In addition, the transmitting/receiving section 203 may transmit retransmission control information indicating A/N for each CB or A/N for each CBG of the DL signal, and may receive retransmission control information indicating A/N for each CB or CBG of UL signal. Furthermore, the transmitting/receiving section 203 may receive retransmission unit information.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 14:
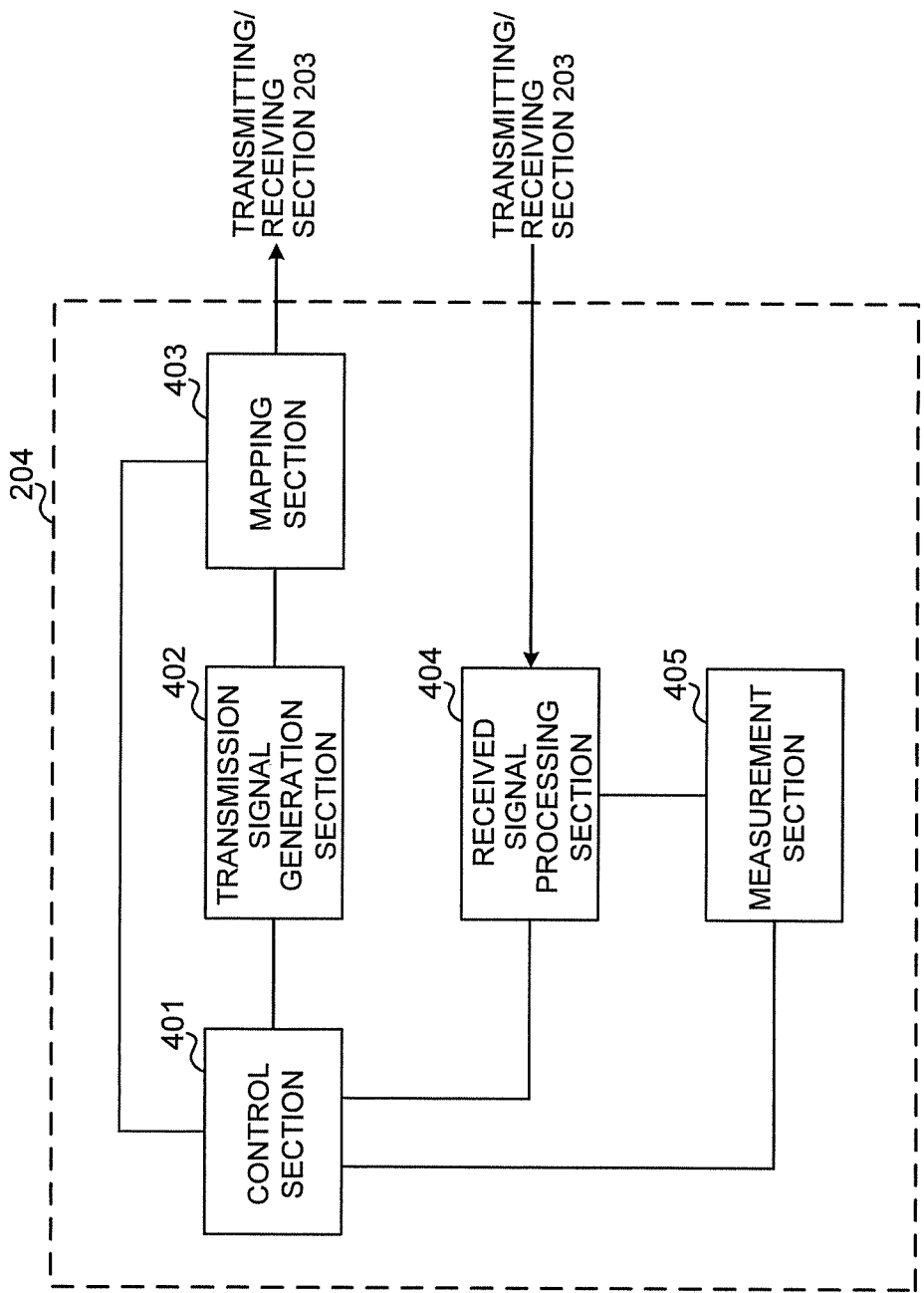
FIG. 14 is a diagram to show an example of a functional structure of a user terminal according to the present embodiment.

FIG. 14 is a diagram to show an example of a functional structure of a user terminal according to present embodiment. Note that, although FIG. 14 primarily shows functional blocks that pertain to characteristic parts of the present embodiment, the user terminal 20 has other functional blocks that are necessary for radio communication as well. As shown in FIG. 14, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, DL signal receiving processes by the received signal processing section 404, UL signal generation processes by the transmission signal generation section 402, mapping of UL signals by the mapping section 403, and measurement by the measurement section 405.

To be more specific, the control section 401 controls receiving processes (for example, demodulation, decoding, etc.) of DL signals based on DCI (DL assignment). For example, based on the modulation scheme indicated by the MCS index in DCI, the control section 401 may control the received signal processing section 404 to demodulate DL signals. Also, the control section 401 may determine the TBS based on the TBS index indicated by the MCS index and the number of allocated resource blocks, and control the received signal processing section 404 to decode DL signals based on the TBS.

In addition, the control section 401 may control the receiving processing of a DL signal, in which a transport block (TB) is divided into a plurality of code blocks (CB), based on at least one of each HARQ process number (HPN) assigned to each CB or each CBG in DCI, an index of each CB or each CBG, an NDI of each HARQ process, and an RV of each HARQ process (first aspect, FIG. 4 and FIG. 5).

Furthermore, when the transport block (TB) of the DL signal is divided into multiple code blocks (CBs), the control section 401 controls transmission of retransmission control information representing A/Ns for each CB or A/Ns for each code block group (CBG) grouping a number of CBs fewer than the above multiple CBs (first aspect, FIG. 4 and FIG. 5). To be more specific, the control section 401 controls the transmission signal generation section 402 so as to generate retransmission control information representing A/Ns for each CB or CBG based on the decoding result of each CB.

Here, the retransmission control information may be a bitmap comprised of a number of bits equal to the number of CBs or CBGs per TB (FIG. 6), or pattern information indicating a combination of A/Ns for each CB or each CBG (FIG. 7).

Also, the control section 401 controls the generation and transmission processes (for example encoding, modulation, mapping etc.) of UL signals based on DCI (UL grants). For example, based on the modulation scheme indicated by the MCS index in DCI, the control section 401 may control the transmission signal generator section 402 to modulate UL signals. Also, the control section 401 may determine the TBS based on the TBS index indicated by the MCS index and the number of allocated resource blocks, and control a transmission signal generation section 402 to encode the UL signal based on the TBS.

Furthermore, the control section 401, when the TBS exceeds a predetermined threshold, code block segmentation, which divides a TBS into multiple CBs, may be applied to the UL signals. Alternatively, based on the application command by higher layer signaling and/or DCI, the control section 401 may apply code block segmentation to UL signals.

Also, when the TB of a UL signal is divided into a plurality of CBs, the control section 401 may control retransmission of the UL signal for each CB or for each CBG grouping fewer code blocks than the plurality of CBs (FIG. 8 and FIG. 9).

For example, the control section 401 may control the transmission signal generation section 402 and the mapping section 403 so as to retransmit CBs or CBGs in each HARQ process based on at least one of each HPN included in DCI (UL grant) from the radio base station 10, and the NDI and the RV of each HPN. Furthermore, the control section 401 may control the transmission signal generation section 402 and the mapping section 403 so that retransmission CB or retransmission CBG and new data are transmitted in the same UL signal (FIG. 8 and FIG. 9).

HARQ processes for use for retransmission control of DL signals and/or UL signals in units of CBs or CBGs as described above are assigned per CB or per CBG. The maximum number of HARQ processes may be equal to or different from the maximum number of HARQ processes assigned per TB (may be different between DL and UL). Also, the maximum number of transmissions in each HARQ process may be equal to or different from the maximum number of transmissions in each HARQ process assigned for each TB.

Furthermore, the control section 401 may control the retransmission unit (for example, CB or CBG, or CB, CBG or TB). For example, the control section 401 may identify the retransmission unit based on at least one of numerologies, frequency band, cell (component carrier), TBS, maximum number of HARQ processes. Alternatively, the control section 401 may designate and control (switch) the retransmission unit by at least one of higher layer signaling, DCI and capability information of the user terminal.

For the control section 401, a controller, a control circuit or control apparatus that can be described based on general understanding of the technical field to which the present invention pertains can be used.

The transmission signal generation section 402 generates retransmission control information for UL signals and DL signals (including, for example, encoding, rate matching, puncturing, modulation, etc.) based on commands from the control section 401 and outputs these signals to the mapping section 403. For the transmission signal generation section 402, a signal generator, a signal generation circuit or signal generation apparatus that can be described based on general understanding of the technical field to which the present invention pertains can be used.

The mapping section 403 maps retransmission control information for UL signals and DL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals. For example, according to a command from the control section 401, the received signal processing section 404 may perform decoding processes on a per CB basis and output the decoding result of each CB to the control section 401.

The received signal processing section 404 outputs the information received from the radio base station 10, to the control section 401. The received signal processing section 404 outputs, for example, broadcast information, system information, higher layer control information by higher layer signaling such as RRC signaling, L1/L2 control information (for example, UL grant, DL assignment, etc.) and so on to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
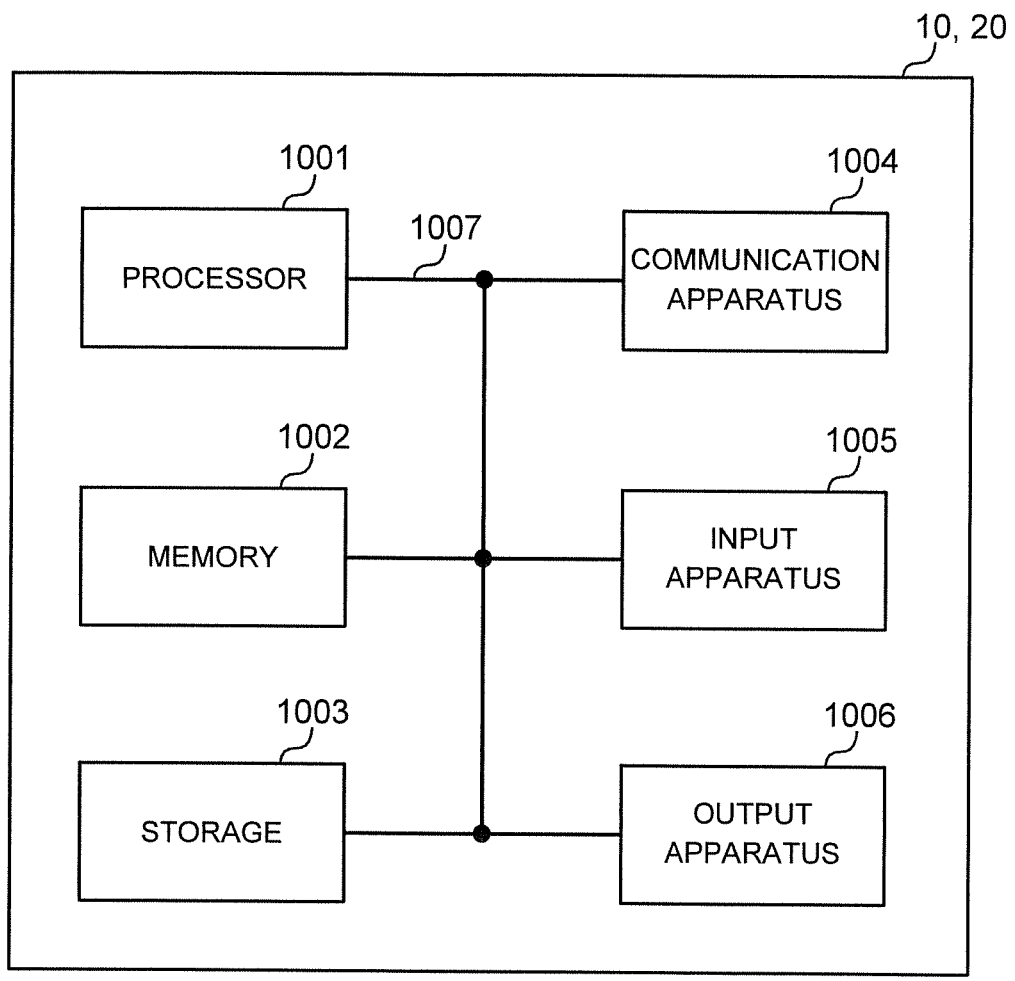
FIG. 15 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 15 is a diagram to show an example hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads program's (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus.

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling"). Also, "signals" may be "messages. A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe. Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIB s) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side."

For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-121998, filed on Jun. 20, 2016, including the specification, drawings and abstract, is incorporated herein by reference in its entirety.

The invention claimed is:

1. A terminal comprising:
a transmitter that transmits capability information, of the terminal, which indicates whether the terminal supports code-block-group based retransmission of a downlink (DL) signal;
a receiver that receives downlink control information (DCI) that allocates the DL signal based on the code-block-group and receives the DL signal, wherein the DCI includes at least one of a Hybrid Automatic Repeat reQuest (HARQ) process number, information of each code-block-group, a new data identifier (NDI) of each HARQ process, and a redundancy version (RV) of each HARQ process, wherein the RV indicates a degree in redundancy of transmission data; and
a processor that, if the receiver receives indication information, via higher layer signaling, that indicates code-block-group based transmission, performs a control to transmit retransmission control information, which indicates an acknowledgement (ACK), or a negative acknowledgement (NACK), per code block group of the DL signal,
wherein the capability information is transmitted via Radio Resource Control (RRC) signaling, and
wherein a number of bits of the retransmission control information is equal to a number of code block groups per transport block.

2. A radio communication method comprising:
transmitting capability information, of a terminal, which indicates whether the terminal supports code-block-group based retransmission of a downlink (DL) signal;
receiving downlink control information (DCI) that allocates the DL signal based on the code-block-group and receiving the DL signal, wherein the DCI includes at least one of a Hybrid Automatic Repeat reQuest (HARQ) process number, information of each code-block-group, a new data identifier (NDI) of each HARQ process, and a redundancy version (RV) of each HARQ process, wherein the RV indicates a degree in redundancy of transmission data; and
if receiving indication information, via higher layer signaling, that indicates code-block-group based transmission, performing a control to transmit retransmission control information, which indicates an acknowledgement (ACK), or a negative acknowledgement (NACK), per code block group of the DL signal,
wherein the capability information is transmitted via Radio Resource Control (RRC) signaling, and
wherein a number of bits of the retransmission control information is equal to a number of code block groups per transport block.

3. A base station comprising:
a receiver that receives capability information, of a terminal, which indicates whether the terminal supports code-block-group based retransmission of a downlink (DL) signal;
a transmitter that transmits downlink control information (DCI) that allocates the DL signal based on the code-block-group and transmits the DL signal, wherein the DCI includes at least one of a Hybrid Automatic Repeat reQuest (HARQ) process number, information of each code-block-group, a new data identifier (NDI) of each HARQ process, and a redundancy version (RV) of each HARQ process, wherein the RV indicates a degree in redundancy of transmission data; and
a processor that, if the transmitter transmits, to the terminal, indication information, via higher layer signaling, that indicates code-block-group based transmission, performs a control to receive retransmission control information, which indicates an acknowledgement (ACK), or a negative acknowledgement (NACK), per code block group,
wherein the capability information is received via Radio Resource Control (RRC) signaling, and wherein a number of bits of the retransmission control information is equal to a number of code block groups per transport block.

4. A system comprising a base station and a terminal, wherein:
the terminal comprises:
a transmitter of the terminal that transmits capability information, of the terminal, which indicates whether the terminal supports code-block-group based retransmission of a downlink (DL) signal;
a receiver of the terminal that receives downlink control information (DCI) that allocates the DL signal based on the code-block-group and receives the DL signal, wherein the DCI includes at least one of a Hybrid Automatic Repeat reQuest (HARQ) process number, information of each code-block-group, a new data identifier (NDI) of each HARQ process, and a redundancy version (RV) of each HARQ process, wherein the RV indicates a degree in redundancy of transmission data; and
a processor that, if the receiver of the terminal receives indication information, via higher layer signaling, that indicates code-block-group based transmission, performs a control to transmit retransmission control information, which indicates an acknowledgement (ACK), or a negative acknowledgement (NACK), per code block group of the DL signal,
wherein a number of bits of the retransmission control information is equal to a number of code block groups per transport block; and
the base station comprises:
a receiver of the base station that receives the capability information; and
a transmitter of the base station that transmits the DCI that allocates the DL signal based on the code block group and transmits the DL signal,
wherein the capability information is transmitted via Radio Resource Control (RRC) signaling.

* * * * *